United States Patent
Yoo et al.

(10) Patent No.: US 11,543,841 B2
(45) Date of Patent: Jan. 3, 2023

(54) POWER MANAGER CIRCUIT AND ELECTRONIC DEVICE FOR DETECTING INTERNAL ERRORS

(71) Applicant: SAMSUNG ELECTRONICS CO., LTD., Suwon-si (KR)

(72) Inventors: Sungmin Yoo, Seoul (KR); Joowon Park, Hwaseong-si (KR); Tae-Hwang Kong, Suwon-si (KR); Sangho Kim, Suwon-si (KR); Hyunmyoung Kim, Suwon-si (KR); Jaeseung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 259 days.

(21) Appl. No.: 17/069,500

(22) Filed: Oct. 13, 2020

(65) Prior Publication Data

US 2021/0294365 A1 Sep. 23, 2021

(30) Foreign Application Priority Data

Mar. 19, 2020 (KR) .................. 10-2020-0034091

(51) Int. Cl.
*G05F 1/46* (2006.01)
*G05F 3/16* (2006.01)
*G06F 1/3206* (2019.01)
*G05F 1/565* (2006.01)

(52) U.S. Cl.
CPC .............. *G05F 1/468* (2013.01); *G05F 1/565* (2013.01); *G05F 3/16* (2013.01); *G06F 1/3206* (2013.01)

(58) Field of Classification Search
CPC .............. G05F 1/468; G05F 1/565; G05F 3/16
See application file for complete search history.

(56) References Cited

U.S. PATENT DOCUMENTS

| | | | |
|---|---|---|---|
| 6,204,653 B1 | 3/2001 | Wouters et al. | |
| 8,994,446 B2 | 3/2015 | Pietri et al. | |
| 9,246,460 B2 | 1/2016 | Khlat et al. | |
| 9,778,303 B2 | 10/2017 | Tumati et al. | |
| 9,939,830 B1 | 4/2018 | Lee et al. | |
| 10,268,222 B1* | 4/2019 | Chang | G05F 1/561 |
| 10,432,088 B1 | 10/2019 | Chang | |
| 2018/0284164 A1 | 10/2018 | Sakaguchi | |
| 2018/0287572 A1 | 10/2018 | Oishi | |
| 2020/0272183 A1* | 8/2020 | Liang | G05F 1/461 |

FOREIGN PATENT DOCUMENTS

| KR | 10-2012-0050247 A | 6/2012 |
|---|---|---|
| KR | 10-1629180 B1 | 6/2016 |

\* cited by examiner

*Primary Examiner* — Kyle J Moody
*Assistant Examiner* — Lakaisha Jackson
(74) *Attorney, Agent, or Firm* — Sughrue Mion, PLLC

(57) ABSTRACT

A power manager circuit is provided. The power manager circuit includes a bandgap reference circuit, first and second monitoring circuits, and a reference buffer. The bandgap reference circuit generates a first voltage, based on an external voltage that is external to the power manager circuit. The first monitoring circuit determines a logical value of a first alarm signal, based on whether a first voltage level of the first voltage is within a first range. The reference buffer generates a second voltage, based on the first voltage. The second monitoring circuit determines a logical value of a second alarm signal, based on whether a second voltage level of the second voltage is within a second range.

20 Claims, 15 Drawing Sheets

POWER MANAGER CIRCUIT AND ELECTRONIC DEVICE FOR DETECTING INTERNAL ERRORS

CROSS-REFERENCE TO RELATED APPLICATIONS

This application claims priority under 35 U.S.C. § 119 to Korean Patent Application No. 10-2020-0034091 filed on Mar. 19, 2020, in the Korean Intellectual Property Office, the entire contents of which are incorporated by reference herein in their entirety.

BACKGROUND

1. Field

Various embodiments described herein relate to an electronic device, and more particularly, relate to an electronic device for detecting an error occurring in a power manager circuit.

2. Description of Related Art

A semiconductor device operates based on a voltage supplied from the outside. The semiconductor device converts the voltage supplied from the outside into an internal voltage. The internal voltage has a voltage level necessary for an internal circuit of the semiconductor device to operate.

The semiconductor device may include a power manager circuit for the purpose of generating the internal voltage. For example, the power manager circuit may be included in a power management integrated circuit (PMIC) or an application processor (AP). The power manager circuit generates the internal voltage by using the voltage supplied from the outside. Also, the power manager circuit is configured to consistently maintain a level of the internal voltage at a target level. The power manager circuit is being used variously in electronic devices that need a uniform internal voltage.

When an error occurs in the power manager circuit, the voltage level of the internal voltage changes. When the voltage level of the internal voltage is not within a normal range, an internal circuit of the semiconductor device may provide an abnormal operation. Accordingly, in a device, which is directly associated with safety of a user, such as an autonomous driving device, it is advantageous to detect an error occurring in the power manager circuit.

SUMMARY

It is an aspect to provide an electronic device for detecting an error occurring in a power manager circuit.

According to an aspect of one or more exemplary embodiments, there is provided a power manager circuit comprising a bandgap reference circuit configured to generate a first voltage, based on an external voltage that is external to the power manager circuit; a first monitoring circuit configured to determine a logical value of a first alarm signal, based on whether a first voltage level of the first voltage is within a first range; a reference buffer configured to generate a second voltage, based on the first voltage; and a second monitoring circuit configured to determine a logical value of a second alarm signal, based on whether a second voltage level of the second voltage is within a second range.

According to another aspect of one or more exemplary embodiments, there is provided an electronic device comprising a bandgap reference circuit configured to generate a first voltage, based on an external voltage; a first monitoring circuit configured to determine whether a first error occurs in the bandgap reference circuit based on the first voltage and to determine a logical value of a first alarm signal depending on whether the first error occurs; a reference buffer configured to generate a second voltage, based on the first voltage; and a second monitoring circuit configured to determine whether a second error occurs in the reference buffer based on the second voltage and to determine a logical value of a second alarm signal depending on whether the second error occurs.

According to another aspect of one or more exemplary embodiments, there is provided an electronic device comprising a power manager circuit configured to generate a first voltage based on an external voltage that is external to the power manager circuit, to output a first alarm signal when a voltage level of the first voltage is not within a first range, to generate a second voltage based on the first voltage, and to output a second alarm signal when a voltage level of the second voltage is not within a second range; and a controller configured to determine a hazard level indicating one or more errors occurring in the power manager circuit based on the first alarm signal and the second alarm signal, and to control the power manager circuit based on the hazard level.

According to another aspect of one or more exemplary embodiments, there is provided an electronic device comprising an operation circuit; a controller; and a power manager circuit configured to generate an output voltage for driving the operation circuit, internally generate a first voltage and a second voltage on both of which the output voltage is based, output a first alarm signal based on a first error in the first voltage, a second alarm signal based on a second error in the second voltage, and a third alarm signal based on the output voltage and the second voltage, and output the first alarm signal, the second alarm signal and the third alarm signal to the controller, wherein the controller is configured to determine a hazard level in the power manager circuit based on the first alarm signal, the second alarm signal and the third alarm signal, and control the power manager circuit and the operation circuit based on the hazard level.

BRIEF DESCRIPTION OF THE FIGURES

The above and other aspects will become apparent by describing in detail exemplary embodiments thereof with reference to the accompanying drawings, in which.

DETAILED DESCRIPTION

Below, various exemplary embodiments are described in detail and clearly to such an extent that an ordinary one in the art may easily implement the techniques of the present disclosure.

Figure 1:
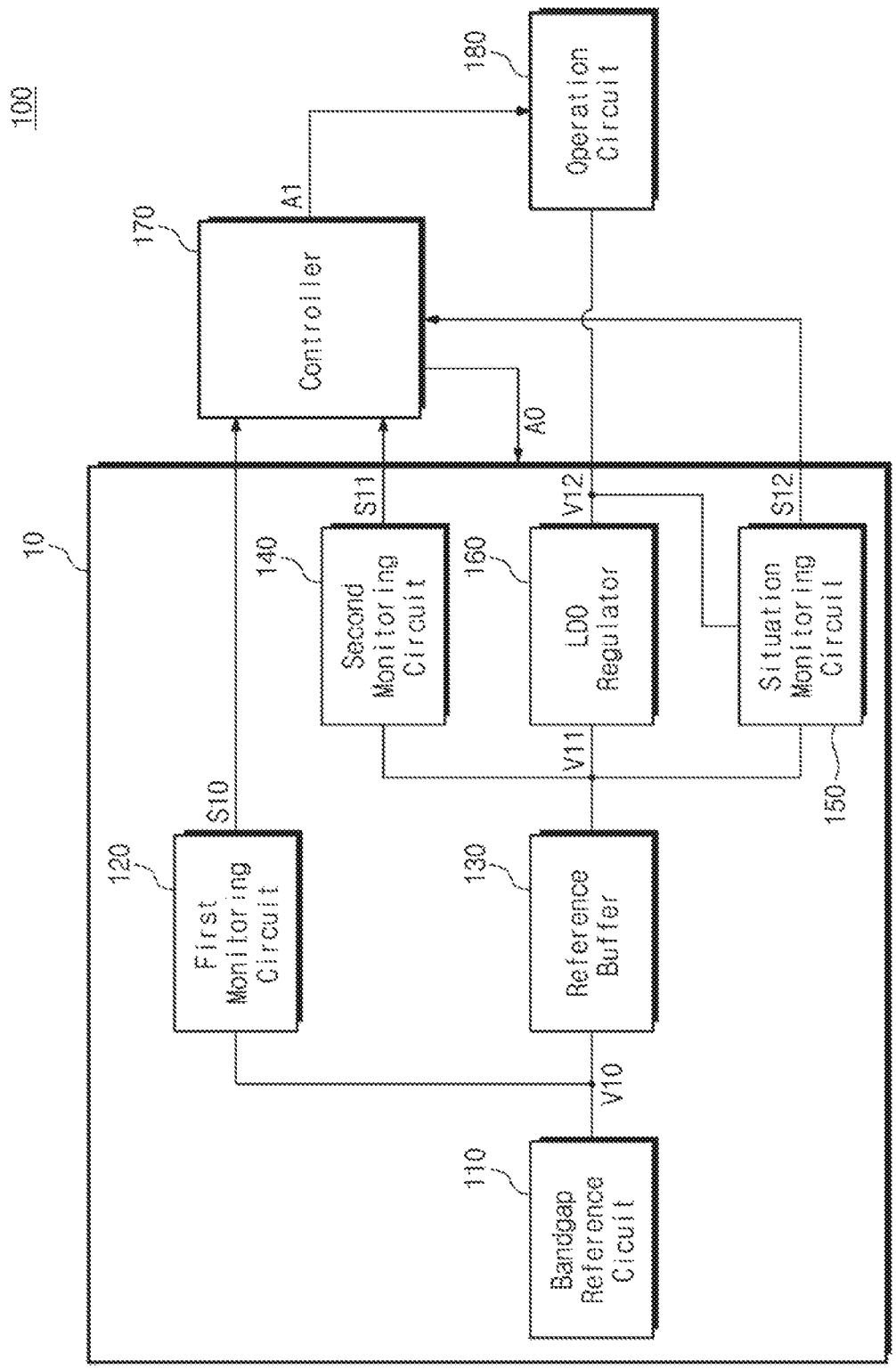
FIG. 1 is a block diagram illustrating an electronic device for detecting an internal error of a power manager circuit, according to an embodiment.

FIG. 1 is a block diagram illustrating an electronic device for detecting an internal error of a power manager circuit, according to an embodiment.

An electronic device 100 may include a bandgap reference circuit 110, a first monitoring circuit 120, a reference buffer 130, a second monitoring circuit 140, a situation monitoring circuit 150, a low drop out (LDO) regulator 160, a controller 170, and an operation circuit 180. In the following description, a power manager circuit 10 denotes a circuit including the bandgap reference circuit 110, the first monitoring circuit 120, the reference buffer 130, the second monitoring circuit 140, the LDO regulator 160, and the situation monitoring circuit 150. However, exemplary embodiments are not limited thereto. For example, in some exemplary embodiments, the power manager circuit 10 may omit some of the components illustrated in FIG. 1 or may further include one or more components not illustrated in FIG. 1.

Also, in the following description, the electronic device 100 may be realized as an autonomous driving device that drives automatically in a state where a driver does not control a brake, a handle, an accelerator, etc., but exemplary embodiments are not limited thereto. The electronic device 100 may be realized and implemented as one of various types of electronic devices, such as a smartphone, a tablet personal computer (PC), a laptop PC, an e-book reader, an MP3 player, a wearable device, or the like in addition to the autonomous driving device.

The bandgap reference circuit 110 may be supplied with an external voltage from the outside the power manager circuit 10. The external voltage may be a supply voltage VDD and/or a ground voltage VSS. A voltage level of the supply voltage VDD may be higher than a voltage level of the ground voltage VSS. Also, voltage levels of voltages V10, V11, and V12 that are generated by the power manager circuit 10 may have values between the voltage level of the supply voltage VDD and the voltage level of the ground voltage VSS.

The bandgap reference circuit 110, the first monitoring circuit 120, the reference buffer 130, the second monitoring circuit 140, the situation monitoring circuit 150, the LDO regulator 160, and the controller 170 may operate based on the external voltage.

The bandgap reference circuit 110 may generate the voltage V10 by using the external voltage. The bandgap reference circuit 110 may generate the voltage V10, the voltage level of which does not change depending on a temperature and an external environment.

The first monitoring circuit 120 may receive the voltage V10. The first monitoring circuit 120 may determine whether an error occurs in the bandgap reference circuit 110, based on the voltage level of the voltage V10. For example, the first monitoring circuit 120 may determine whether the voltage V10 is within a normal range. In this case, the normal range means a voltage level range that the voltage V10 is capable of having when an error does not occur in the bandgap reference circuit 110. The normal range may be set experimentally or may be preset. In the following description, to determine whether the voltage V10 is within the normal range means to check whether the voltage level of the voltage V10 is within the normal range and whether the bandgap reference circuit 110 is operating normally without an error.

When it is determined that the voltage V10 is within the normal range, the first monitoring circuit 120 may output an alarm signal S10 indicating a first logical value to the controller 170. When it is determined that the voltage V10 is not within the normal range, the first monitoring circuit 120 may output the alarm signal S10 indicating a second logical value to the controller 170.

In the following description, the first logical value and the second logical value may mean a logical value of "0" and a logical value of "1", respectively. However, exemplary embodiments are not limited thereto. The alarm signal S10 indicating the first logical value and the alarm signal S10 indicating the second logical value may be a voltage signal having a voltage level corresponding to the first logical value and a voltage signal having a voltage level corresponding to the second logical value, respectively. Also, in some exemplary embodiments, when it is determined that the voltage V10 is within the normal range, the first monitoring circuit 120 may not output the alarm signal S10, and when it is determined that the voltage V10 is not within the normal range, the first monitoring circuit 120 may output the alarm signal S10. The second monitoring circuit 140 and the situation monitoring circuit 150 may respectively generate an alarm signal S11 and an alarm signal S12 in substantially the same manner as the first monitoring circuit 120 described above.

The reference buffer 130 may be supplied with the voltage V10. The reference buffer 130 may generate the voltage V11 by using the voltage V10. The voltage V11 may be a voltage that is used by the LDO regulator 160.

The second monitoring circuit 140 may receive the voltage V11. The second monitoring circuit 140 may determine whether an error occurs in the reference buffer 130, based on the voltage level of the voltage V11. The second monitoring circuit 140 may determine whether the voltage V11 is within a normal range. In this case, the normal range means a voltage level range that the voltage V11 is capable of having when an error does not occur in the reference buffer 130. The normal range may be set experimentally or may be preset. In some exemplary embodiments, the normal range of the reference buffer 130 may be different than the normal range of the bandgap reference circuit 110.

When it is determined that the voltage V11 is within the normal range, the second monitoring circuit 140 may output an alarm signal S11 indicating the first logical value to the controller 170. When it is determined that the voltage V11 is not within the normal range, the second monitoring circuit 140 may output the alarm signal S11 indicating the second logical value to the controller 170.

The LDO regulator 160 may be supplied with the voltage V11. The LDO regulator 160 may generate a voltage V12 by using the voltage V11. In some exemplary embodiments, the LDO regulator 160 may step down the voltage level of the voltage V11 to generate the voltage V12. In some exemplary embodiments, the voltage level difference of the voltage V11 and the voltage V12 may be relatively small. For example, the LDO regulator 160 may be a DC linear LDO regulator.

The LDO regulator 160 may output the voltage V12 to the operation circuit 180. The operation circuit 180 may operate based on the voltage V12.

The situation monitoring circuit 150 may receive the voltage V11 and the voltage V12. The situation monitoring circuit 150 may determine whether an error occurs in the LDO regulator 160, based on the voltage V11 and the voltage V12. However, exemplary embodiments are not limited thereto. For example, the situation monitoring circuit 150 may be a monitoring circuit that finally determines whether the voltage V12 is abnormal before the voltage V12 is output from the power manager circuit 10. That is, the situation monitoring circuit 150 may finally monitor an internal situation of the power manager circuit 10. Below, the description will focus on an example in which the situation monitoring circuit 150 determines whether an error occurs in the LDO regulator 160, based on the voltage V11 and the voltage V12.

When it is determined that an error does not occur in the LDO regulator 160, the situation monitoring circuit 150 may output an alarm signal S12 having the first logical value to the controller 170. When it is determined that an error occurs in the LDO regulator 160, the situation monitoring circuit 150 may output the alarm signal S12 having the second logical value to the controller 170.

The controller 170 may receive the alarm signals S10, S11, and S12. The controller 170 may determine a hazard level indicated by one or more errors occurring in the power manager circuit 10, based on the alarm signals S10, S11, and S12. The controller 170 may generate control signals A0 and A1, based on the hazard level indicated by the one or more errors occurring in the power manager circuit 10 and an automotive safety integrity level (ASIL) of the operation circuit 180. The controller 170 may output the control signal A0 and the control signal A1 to the power manager circuit 10 and the operation circuit 180, respectively. The ASIL will be more fully described with regard to the operation circuit 180.

The operation circuit 180 may be receive the voltage V12 and may be driven by the received voltage V12. The operation circuit 180 may provide a service to the user or the driver through the driving operation. The operation circuit 180 may receive the control signal A1 from the controller 170. Whether the operation circuit 180 is driven may be determined based on the control signal A1.

The operation circuit 180 may provide an autonomous driving-related service to the user or the driver. For example, when the operation circuit 180 receives information from a global positioning system (GPS), the operation circuit 180 may receive a latitude and a longitude of a vehicle that a satellite sends and may seize a course of the driver. For another example, when the operation circuit 180 receives information from a motor encoder, the operation circuit 180 may check a speed of a vehicle based on revolutions per minute (RPM) of a wheel and may reduce an error ratio of the GPS. For another example, the operation circuit 180 may receive information from a laser scanner to prevent a collision accident. The laser scanner may output thousands of laser frequencies per second and may measure signals reflected by an object. For another example, the operation circuit 180 may receive information from a video camera to control a speed of a vehicle. The video camera may measure ambient brightness and may identify a lane sign, a traffic light, a pedestrian, etc.

The ASIL of the operation circuit 180 or the ASIL of the electronic device 100 may be determined based on a service that the operation circuit 180 provides. The ASIL means an automotive safety integrity level, and a value of the ASIL may be determined based on a hazard analysis and risk assessment (HARA). The HARA may be a process for evaluating a level of a hazard affecting a driver when the operation circuit 180 operates abnormally. As the level of the hazard affecting the driver when the operation circuit 180 operates abnormally increases, the ASIL of the operation circuit 180 is determined high.

Also, the controller 170 may control the operation circuit 180 in consideration of the ASIL of the operation circuit 180 and the hazard level indicated by the one or more errors occurring in the power manager circuit 10. In detail, when the hazard level indicated by the one or more errors occurring in the power manager circuit 10 is high, the controller 170 may stop operations of the power manager circuit 10 and the operation circuit 180. When the hazard level indicated by the one or more errors occurring in the power manager circuit 10 is relatively low, the controller 170 may maintain operations of the power manager circuit 10 and the operation circuit 180. Also, when the ASIL of the operation circuit 180 is high, even though the hazard level indicated by the one or more errors occurring in the power manager circuit 10 is relatively low, the controller 170 may stop operations of the power manager circuit 10 and the operation circuit 180. In this case, the controller 170 may provide a notification to the user such that the user stops the autonomous driving and directly drives the vehicle.

According to various exemplary embodiments, the electronic device 100 may detect an error occurring in the power manager circuit 10 with higher accuracy by using the plurality of monitoring circuits 120 and 140. Also, the electronic device 100 may detect errors associated with various situations by using the situation monitoring circuit 150.

Figure 2:
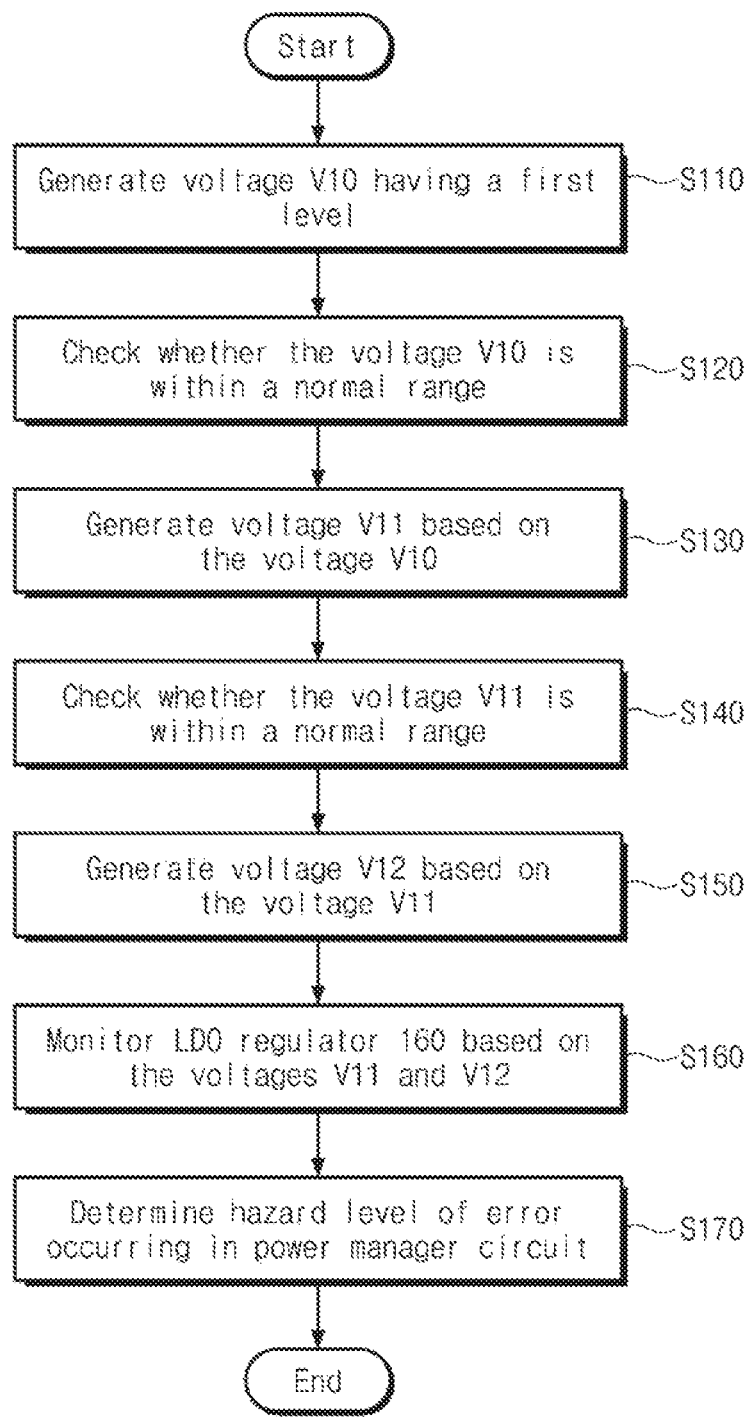
FIG. 2 is a flowchart for describing an error detecting operation of the electronic device of FIG. 1, according to an embodiment.

FIG. 2 is a flowchart for describing an error detecting operation of the electronic device of FIG. 1, according to an exemplary embodiment.

In operation S110, the bandgap reference circuit 110 may generate the voltage V10 having a first level. For example, the bandgap reference circuit 110 may generate the voltage V10 having the first level based on the external voltage applied from outside the power manager circuit 10. The bandgap reference circuit 110 may generate the voltage V10 such that the voltage level of the voltage V10 does not change depending on a temperature and an external environment of the electronic device 100.

In operation S120, the first monitoring circuit 120 may check whether the voltage V10 is within the normal range. The first monitoring circuit 120 may detect an error of the bandgap reference circuit 110, based on whether the voltage V10 is within the normal range. When the voltage V10 is within the normal range, the first monitoring circuit 120 may determine that an error does not occur in the bandgap reference circuit 110. In this case, the first monitoring circuit 120 may output the alarm signal S10 having the first logical value to the controller 170. When the voltage V10 is not within the normal range, the first monitoring circuit 120 may determine that an error occurs in the bandgap reference circuit 110. In this case, the first monitoring circuit 120 may output the alarm signal S10 having the second logical value to the controller 170.

In operation S130, the reference buffer 130 may generate the voltage V11, based on the voltage V10. In detail, the reference buffer 130 may adjust the voltage V10 having the first level to the voltage V11 having a second level.

In operation S140, the second monitoring circuit 140 may check whether the voltage V11 is within the normal range. The second monitoring circuit 140 may detect an error of the reference buffer 130, based on whether the voltage V11 is within the normal range. When the voltage V11 is within the normal range, the first monitoring circuit 140 may determine that an error does not occur in the reference buffer 130. In this case, the second monitoring circuit 140 may output the alarm signal S11 having the first logical value to the controller 170. When the voltage V11 is not within the normal range, the second monitoring circuit 140 may determine that an error occurs in the reference buffer 130. In this case, the second monitoring circuit 140 may output the alarm signal S11 having the second logical value to the controller 170. In some exemplary embodiments, the normal range in operation S120 and the normal range in operation S140 may be different ranges.

In operation S150, the LDO regulator 160 may generate the voltage V12, based on the voltage V11. In detail, the LDO regulator 160 may adjust the voltage V11 having the second level to the voltage V12 having a third level.

In operation S160, the situation monitoring circuit 150 may monitor the LDO regulator 160, based on the voltage V11 and the voltage V12. That is, the situation monitoring circuit 150 may check whether an error occurs in the LDO regulator 160, based on the voltage V11 and the voltage V12. When it is determined that an error does not occur in the LDO regulator 160, the situation monitoring circuit 150 may output the alarm signal S12 having the first logical value. When it is determined that an error occurs in the LDO regulator 160, the situation monitoring circuit 150 may output the alarm signal S12 having the second logical value to the controller 170.

In operation S170, the controller 170 may determine a hazard level of the error occurring in the power manager circuit 10. For example, the controller 170 may determine the hazard level of the error occurring in the power manager circuit 10, based on the alarm signals S10, S11, and S12. The controller 170 may control the operation circuit 180 and the power manager circuit 10, based on the hazard level of the error and the ASIL of the operation circuit 180.

Figure 3:
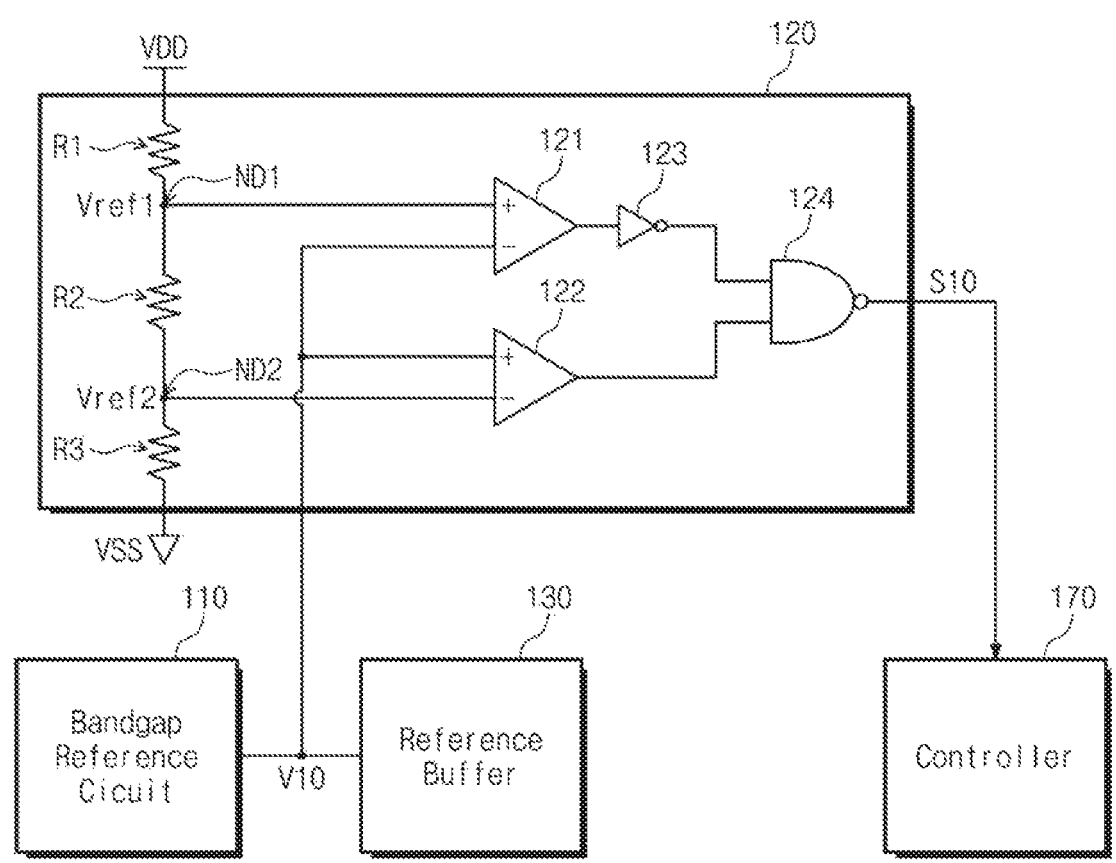
FIG. 3 is a circuit diagram illustrating a configuration of a first monitoring circuit of the electronic device of FIG. 1, according to an embodiment.

FIG. 3 is a circuit diagram illustrating a configuration of a first monitoring circuit of the electronic device of FIG. 1, according to an exemplary embodiment.

The first monitoring circuit 120 may include a plurality of resistors R1, R2, and R3, a plurality of comparators 121 and 122, an inverter 123, and a logic gate 124. The first monitoring circuit 120 illustrated in FIG. 3 is only an example of an embodiment for implementing the first monitoring circuit 120 described with reference to FIG. 1. Accordingly, in some exemplary embodiments, the first monitoring circuit 120 may omit some of the components illustrated in FIG. 3 or may further include one or more components not illustrated in FIG. 3. Exemplary embodiments are not limited to the configuration illustrated in FIG. 3.

The first monitoring circuit 120 may operate based on the supply voltage VDD and the ground voltage VSS. The first monitoring circuit 120 may receive the voltage V10. The first monitoring circuit 120 may determine whether the voltage V10 is within the normal range.

The first monitoring circuit 120 may generate voltages Vref1 and Vref2 to be compared with the voltage V10, by using the supply voltage VDD, the ground voltage VSS, and the plurality of resistors R1, R2, and R3. The resistor R1 may be placed between a node to which the supply voltage VDD is applied and a node ND1. The resistor R2 may be placed between the node ND1 and a node ND2. The resistor R3 may be placed between the node ND2 and a node to which the ground voltage VSS is applied. The voltages Vref1 and Vref2 may be voltages of the nodes ND1 and ND2, respectively.

A positive terminal of the comparator 121 may be connected with the node ND1. The comparator 121 may receive the voltage Vref1 from the node ND1. The voltage Vref1 may have a voltage level between the voltage level of the supply voltage VDD and the voltage level of the ground voltage VSS. The voltage level of the voltage Vref1 may be inversely proportional to a resistance magnitude of the resistor R1. The voltage level of the voltage Vref1 may be proportional to resistance magnitudes of the resistors R2 and R3. In detail, the voltage level of the voltage Vref1 is expressed by Equation 1 below.

$$Vref1 = \frac{R2 + R3}{R1 + R2 + R3} \times (V_{DD} - V_{SS}) + V_{SS} \qquad \text{[Equation 1]}$$

In Equation 1 above, "R1", "R2", and "R3" denote a resistance magnitude of the resistor R1, a resistance magnitude of the resistor R2, and a resistance magnitude of the resistor R3, respectively. Also, "Vref1", "VDD", and "VSS" denote a voltage level of the voltage Vref1, a voltage level of the voltage VDD, and a voltage level of the voltage VSS, respectively.

A negative terminal of the comparator 121 may be connected with a node between the bandgap reference circuit 110 and the reference buffer 130. The voltage V10 may be applied to the negative terminal of the comparator 121.

The comparator 121 may compare the voltage Vref1 and the voltage V10. When the voltage level of the voltage V10 is lower than the voltage level of the voltage Vref1, the comparator 121 may output a signal having the first logical value. The inverter 123 may invert the signal received from the comparator 121. In this case, the inverter 123 may receive the signal having the first logical value from the comparator 121 and may output a signal having the second logical value. When the voltage level of the voltage V10 is equal to or higher than the voltage level of the voltage Vref1, the comparator 121 may output the signal having the second logical value. In this case, the inverter 123 may receive the signal having the second logical value from the comparator 121 and may output the signal having the first logical value.

A positive terminal of the comparator 122 may be connected with the node between the bandgap reference circuit 110 and the reference buffer 130. The voltage V10 may be applied to the positive terminal of the comparator 122. A negative terminal of the comparator 122 may be connected with the node ND2. The comparator 122 may receive the voltage Vref2 from the node ND2. The voltage Vref2 may have a voltage level between the voltage level of the supply voltage VDD and the voltage level of the ground voltage VSS. The voltage level of the voltage Vref2 may be inversely proportional to the resistance magnitudes of the resistors R1 and R2. The voltage level of the voltage Vref2 may be proportional to the resistance magnitude of the resistor R3. In detail, the voltage level of the voltage Vref2 is expressed by Equation 2 below.

$$Vref2 = \frac{R3}{R1+R2+R3} \times (V_{DD} - V_{SS}) + V_{SS} \quad \text{[Equation 2]}$$

In Equation 2 above, "R1", "R2", and "R3" denote the resistance magnitude of the resistor R1, the resistance magnitude of the resistor R2, and the resistance magnitude of the resistor R3, respectively. Also, "Vref2", "VDD", and "VSS" denote a voltage level of the voltage Vref2, the voltage level of the voltage VDD, and the voltage level of the voltage VSS, respectively.

The comparator 122 may compare the voltage Vref2 and the voltage V10. When the voltage level of the voltage Vref2 is lower than the voltage level of the voltage V10, the comparator 122 may output a signal having the first logical value. When the voltage level of the voltage Vref2 is equal to or higher than the voltage level of the voltage V10, the comparator 122 may output the signal having the second logical value.

The logic gate 124 may receive the signal output from the inverter 123 and the signal output from the comparator 122. In the following description, it is assumed that the logic gate 124 is a NAND gate, but exemplary embodiments are not limited thereto. In the example illustrated in FIG. 3, the logic gate 124 will only output the alarm signal S10 having the first logical value in the case where both the signal output from the inverter 123 and the signal output from the comparator 122 have the second logical value. The logic gate 124 may output the alarm signal S10 having the second logical value in the remaining cases other than the above case.

That is, the logic gate 124 will only output the alarm signal S10 having the first logical value when the voltage level of the voltage V10 is between the voltage level of the voltage Vref1 and the voltage level of the voltage Vref2. When the voltage level of the voltage V10 is higher than the voltage level of the voltage Vref1 or is lower than the voltage level of the voltage Vref2, the logic gate 124 may output the alarm signal S10 having the second logical value. That the alarm signal S10 having the first logical value is output denotes that an error does not occur in the bandgap reference circuit 110. Also, that the alarm signal S10 having the second logical value is output denotes that an error occurs in the bandgap reference circuit 110.

However, the configuration of the first monitoring circuit 120 is not limited to the example illustrated in FIG. 3. For example, in some exemplary embodiments, the voltage Vref1 and the voltage V10 may be respectively applied to the negative terminal and the positive terminal of the comparator 121. Also, in some exemplary embodiments, the voltage Vref2 and the voltage V10 may be respectively applied to the positive terminal and the negative terminal of the comparator 122. In this case, the inverter 123 may be connected with the comparator 122 instead of the comparator 121.

For another example, in some exemplary embodiments, the voltage Vref1 and the voltage V10 may be respectively applied to the positive terminal and the negative terminal of the comparator 121. The voltage Vref2 and the voltage V10 may be respectively applied to the positive terminal and the negative terminal of the comparator 122. In this case, the first monitoring circuit 120 may not include the inverter 123, and the logic gate 124 may be implemented with an AND gate.

Figure 4:
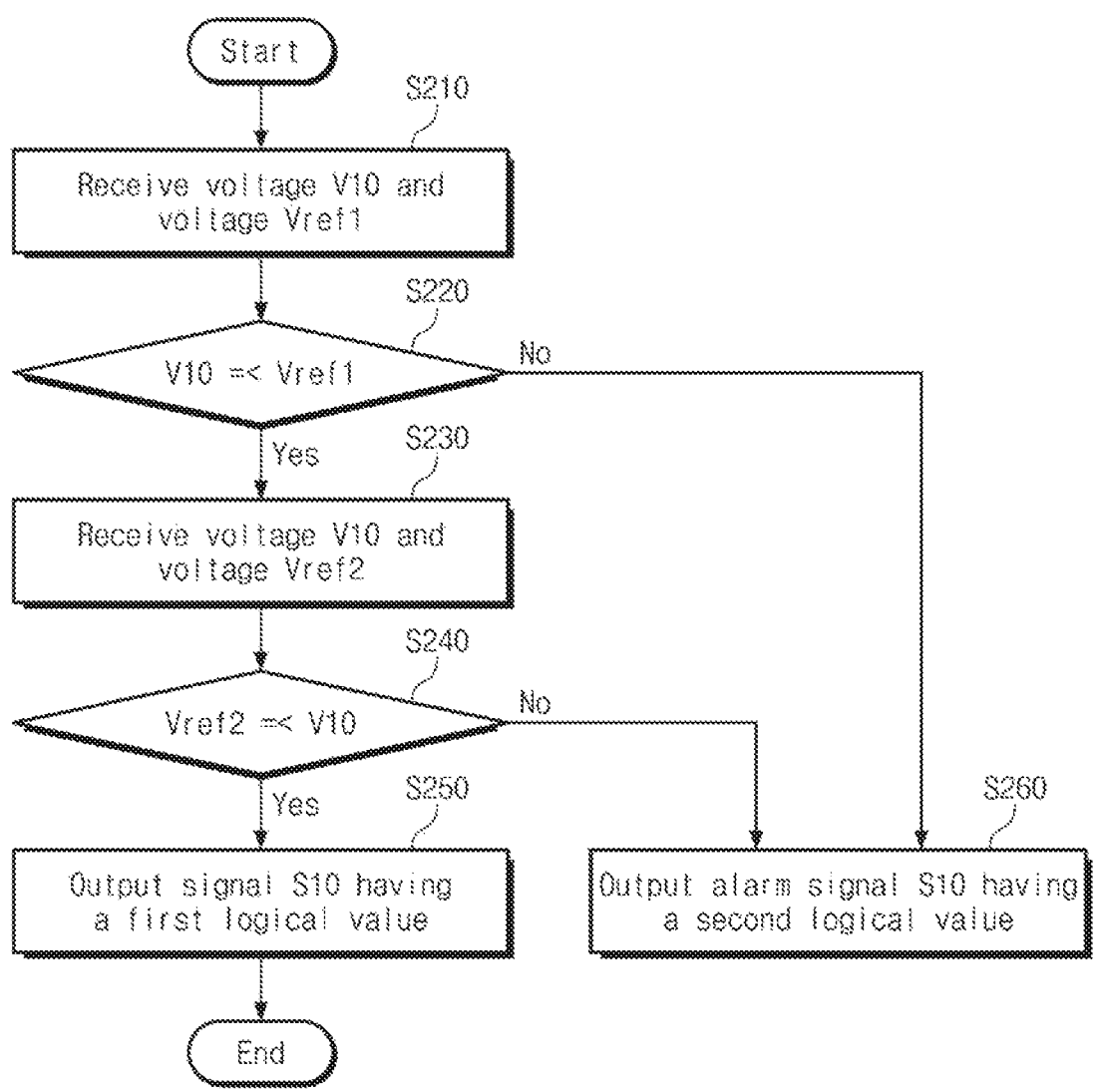
FIG. 4 is a flowchart for describing operations of the first monitoring circuit of FIG. 3, according to an embodiment.

FIG. 4 is a flowchart for describing operations of the first monitoring circuit of FIG. 3, according to an exemplary embodiment.

In operation S210, the comparator 121 may receive the voltage V10 and the voltage Vref1.

In operation S220, the comparator 121 may compare the voltage V10 and the voltage Vref1.

When the voltage level of the voltage V10 is higher than the voltage level of the voltage Vref1 (S220, No), operation S260 is performed. In operation S260, the logic gate 124 may output the alarm signal S10 having the second logical value regardless of the signal output from the comparator 122.

When the voltage level of the voltage V10 is equal to or lower than the voltage level of the voltage Vref1 (S220, Yes), operation S230 is performed. In operation S230, the comparator 122 may receive the voltage V10 and the voltage Vref2.

In operation S240, the comparator 122 may compare the voltage V10 and the voltage Vref2.

When the voltage level of the voltage Vref2 is higher than the voltage level of the voltage V10 (S240, No), operation S260 is performed. In operation S260, the logic gate 124 may output the alarm signal S10 having the second logical value.

When the voltage level of the voltage Vref2 is less than or equal to the voltage level of the voltage V10 (S250, Yes), operation S250 is performed. In operation S250, the logic gate 124 may output the alarm signal S10 having the first logical value.

However, the order of operation S210 to operation S260 that the first monitoring circuit 120 performs is not limited to the order described with reference to FIG. 4. For example, in some exemplary embodiments, operation S230 and operation S240 may be performed before operation S210 and operation S220. For another example, in some exemplary embodiments, operation S230 and operation S240 may be performed at the same time with operation S210 and operation S220.

Figure 5:
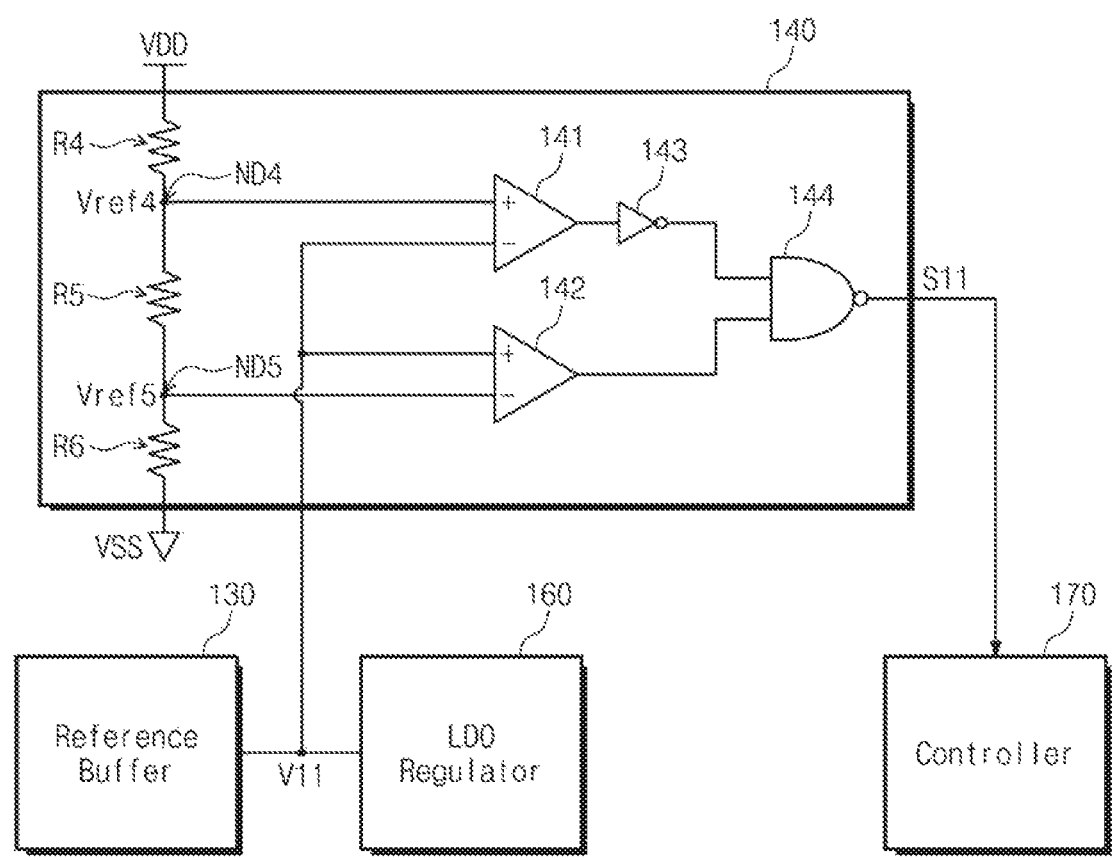
FIG. 5 is a circuit diagram illustrating a configuration of a second monitoring circuit of the electronic device of FIG. 1, according to an embodiment.

FIG. 5 is a circuit diagram illustrating a configuration of the second monitoring circuit of the electronic device of FIG. 1, according to an exemplary embodiment.

The second monitoring circuit 140 may include a plurality of resistors R4, R5, and R6, a plurality of comparators 141 and 142, an inverter 143, and a logic gate 144. The second monitoring circuit 140 illustrated in FIG. 5 is only an example of an embodiment for implementing the second monitoring circuit 140 described with reference to FIG. 1. Accordingly, in some exemplary embodiments, the second monitoring circuit 140 may omit some of the components illustrated in FIG. 5 or may further include one or more components not illustrated in FIG. 5. Exemplary embodiments are not limited to the configuration illustrated in FIG. 5.

The second monitoring circuit 140 may operate based on the supply voltage VDD and the ground voltage VSS. The second monitoring circuit 140 may receive the voltage V11.

The second monitoring circuit 140 may determine whether the voltage V11 is within the normal range.

The second monitoring circuit 140 may generate voltages Vref4 and Vref5 to be compared with the voltage V11, by using the supply voltage VDD, the ground voltage VSS, and the plurality of resistors R4, R5, and R6. The resistor R4 may be placed between a node to which the supply voltage VDD is applied and a node ND4. The resistor R5 may be placed between the node ND4 and a node ND5. The resistor R6 may be placed between the node ND5 and a node to which the ground voltage VSS is applied. The voltages Vref4 and Vref5 may be voltages of the nodes ND4 and ND5, respectively.

A positive terminal of the comparator 141 may be connected with the node ND4. The comparator 141 may receive the voltage Vref4 from the node ND4. The voltage Vref4 may have a voltage level between the voltage level of the supply voltage VDD and the voltage level of the ground voltage VSS. The voltage level of the voltage Vref4 may be inversely proportional to a resistance magnitude of the resistor R4. The voltage level of the voltage Vref4 may be proportional to resistance magnitudes of the resistors R5 and R6. In detail, the voltage level of the voltage Vref4 is expressed by Equation 3 below.

$$Vref4 = \frac{R5 + R6}{R4 + R5 + R6} \times (V_{DD} - V_{SS}) + V_{SS} \quad \text{[Equation 3]}$$

In Equation 3 above, "R4", "R5", and "R6" denote a resistance magnitude of the resistor R4, a resistance magnitude of the resistor R5, and a resistance magnitude of the resistor R6, respectively. Also, "Vref4", "VDD", and "VSS" denote a voltage level of the voltage Vref4, the voltage level of the voltage VDD, and the voltage level of the voltage VSS, respectively.

A negative terminal of the comparator 141 may be connected with a node between the reference buffer 130 and the LDO regulator 160. The voltage V11 may be applied to the negative terminal of the comparator 141.

The comparator 141 may compare the voltage Vref4 and the voltage V11. When the voltage level of the voltage V11 is lower than the voltage level of the voltage Vref4, the comparator 141 may output a signal having the first logical value. The inverter 143 may invert the signal received from the comparator 141. In this case, the inverter 143 may receive the signal having the first logical value from the comparator 141 and may output a signal having the second logical value. When the voltage level of the voltage V11 is equal to or higher than the voltage level of the voltage Vref4, the comparator 141 may output the signal having the second logical value. In this case, the inverter 143 may receive the signal having the second logical value from the comparator 141 and may output the signal having the first logical value.

A positive terminal of the comparator 142 may be connected with the node between the reference buffer 130 and the LDO regulator 160. The voltage V11 may be applied to the positive terminal of the comparator 142.

A negative terminal of the comparator 142 may be connected with the node ND5. The comparator 142 may receive the voltage Vref5 from the node ND5. The voltage Vref5 may have a voltage level between the voltage level of the supply voltage VDD and the voltage level of the ground voltage VSS. The voltage level of the voltage Vref5 may be inversely proportional to the resistance magnitudes of the resistors R4 and R5. The voltage level of the voltage Vref5 may be proportional to the resistance magnitude of the resistor R6. In detail, the voltage level of the voltage Vref5 is expressed by Equation 4 below.

$$Vref5 = \frac{R6}{R4 + R5 + R6} \times (V_{DD} - V_{SS}) + V_{SS} \quad \text{[Equation 4]}$$

In Equation 4 above, "R4", "R5", and "R6" denote the resistance magnitude of the resistor R4, the resistance magnitude of the resistor R5, and the resistance magnitude of the resistor R6, respectively. Also, "Vref5", "VDD", and "VSS" denote a voltage level of the voltage Vref5, the voltage level of the voltage VDD, and the voltage level of the voltage VSS, respectively.

The comparator 142 may compare the voltage Vref5 and the voltage V11. When the voltage level of the voltage Vref5 is lower than the voltage level of the voltage V11, the comparator 142 may output a signal having the first logical value. When the voltage level of the voltage Vref5 is equal to or higher than the voltage level of the voltage V11, the comparator 142 may output the signal having the second logical value.

The logic gate 144 may receive the signal output from the inverter 143 and the signal output from the comparator 142. In the following description, it is assumed that the logic gate 144 is a NAND gate, but exemplary embodiments are not limited thereto. The logic gate 144 will only output the alarm signal S11 having the first logical value in the case where both the signal output from the inverter 143 and the signal output from the comparator 142 have the second logical value. The logic gate 144 may output the alarm signal S11 having the second logical value in the remaining cases other than the above case.

That is, the logic gate 144 will only output the alarm signal S11 having the first logical value when the voltage level of the voltage V11 is between the voltage level of the voltage Vref4 and the voltage level of the voltage Vref5. When the voltage level of the voltage V11 is higher than the voltage level of the voltage Vref4 or is lower than the voltage level of the voltage Vref5, the logic gate 144 may output the alarm signal S11 having the second logical value. That the alarm signal S11 having the first logical value is output denotes that an error does not occur in the reference buffer 130. Also, that the alarm signal S11 having the second logical value is output denotes that an error occurs in the reference buffer 130.

However, the configuration of the second monitoring circuit 140 is not limited to the example illustrated in FIG. 5. For example, in some exemplary embodiments, the voltage Vref4 and the voltage V11 may be respectively applied to the negative terminal and the positive terminal of the comparator 141. The voltage Vref5 and the voltage V11 may be respectively applied to the positive terminal and the negative terminal of the comparator 142. In this case, the inverter 143 may be connected with the comparator 142 instead of the comparator 141.

For another example, in some exemplary embodiments, the voltage Vref4 and the voltage V11 may be respectively applied to the positive terminal and the negative terminal of the comparator 141. The voltage Vref5 and the voltage V11 may be respectively applied to the positive terminal and the negative terminal of the comparator 142. In this case, the second monitoring circuit 140 may not include the inverter 143, and the logic gate 144 may be implemented with an AND gate.

Figure 6:
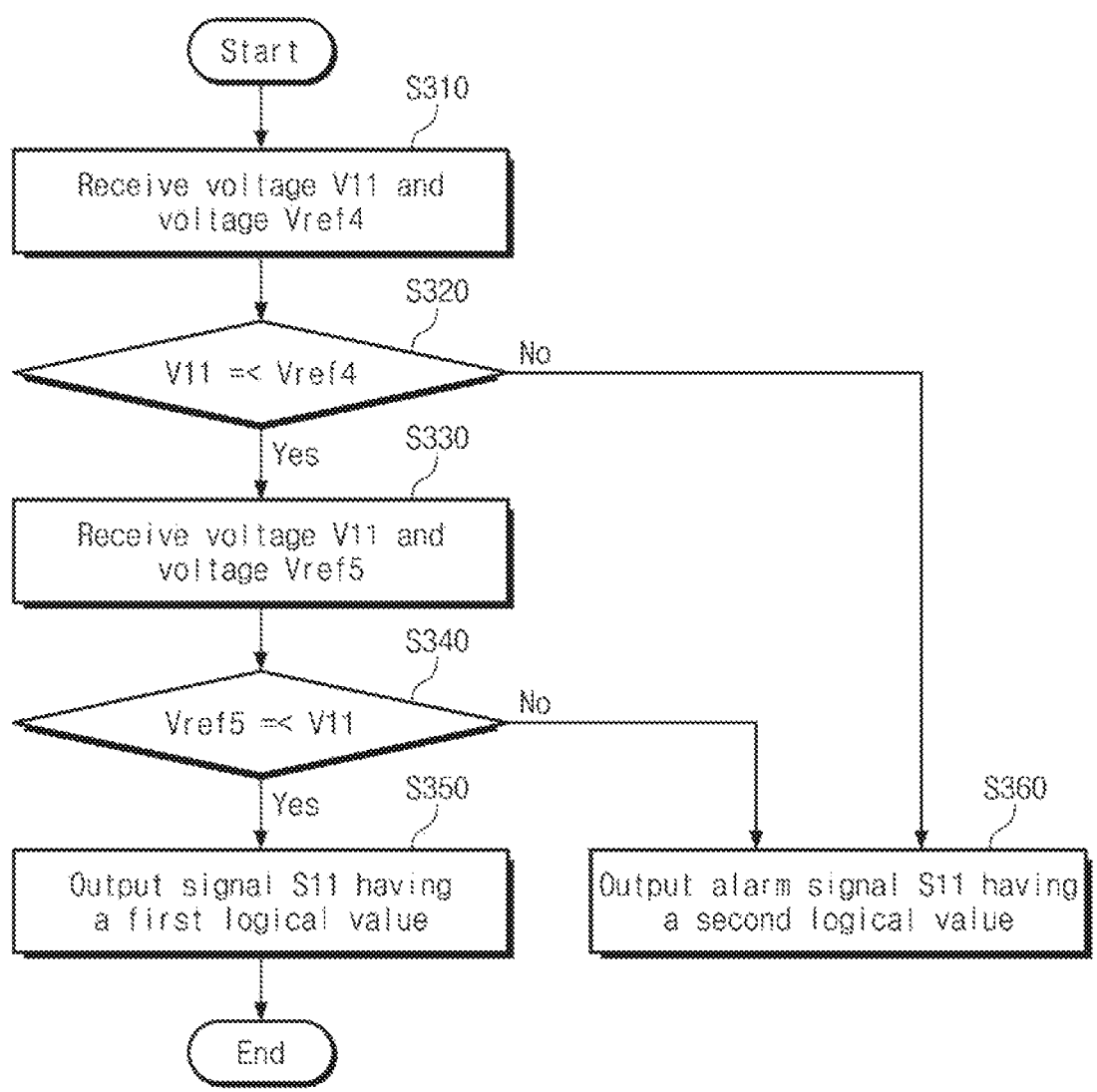
FIG. 6 is a flowchart for describing operations of the second monitoring circuit of FIG. 5, according to an embodiment.

FIG. 6 is a flowchart for describing operations of the second monitoring circuit of FIG. 5, according to an exemplary embodiment.

In operation S310, the comparator 141 may receive the voltage V11 and the voltage Vref4.

In operation S320, the comparator 141 may compare the voltage V11 and the voltage Vref4.

When the voltage level of the voltage V11 is higher than the voltage level of the voltage Vref4 (S320, No), operation S360 is performed. In operation S360, the logic gate 144 may output the alarm signal S11 having the second logical value regardless of the signal output from the comparator 142.

When the voltage level of the voltage V11 is less than or equal to the voltage level of the voltage Vref4 (S320, Yes), operation S330 is performed. In operation S330, the comparator 142 may receive the voltage V11 and the voltage Vref5.

In operation S340, the comparator 142 may compare the voltage V11 and the voltage Vref5.

When the voltage level of the voltage Vref5 is higher than the voltage level of the voltage V11 (S340, No), operation S360 is performed. In operation S360, the logic gate 144 may output the alarm signal S11 having the second logical value.

When the voltage level of the voltage Vref5 is less than or equal to the voltage level of the voltage V11 (S340, Yes), operation S350 is performed. In operation S350, the logic gate 144 may output the alarm signal S11 having the first logical value.

However, the order of operation S310 to operation S360 that the second monitoring circuit 140 performs is not limited to the order described with reference to FIG. 6. For example, in some exemplary embodiments, operation S330 and operation S340 may be performed before operation S310 and operation S320. For another example, in some exemplary embodiments, operation S330 and operation S340 may be performed at the same time with operation S310 and operation S320.

Figure 7:
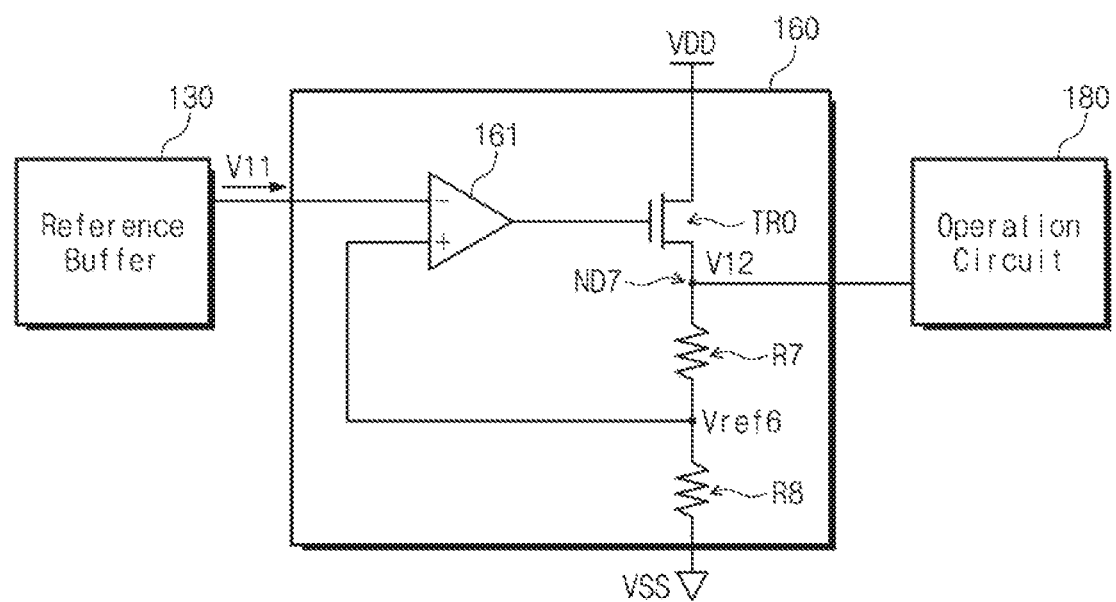
FIG. 7 is a block diagram illustrating a configuration of a low drop out (LDO) regulator of the electronic device of FIG. 1, according to an embodiment.

FIG. 7 is a block diagram illustrating a configuration of an LDO regulator of the electronic device of FIG. 1, according to an exemplary embodiment.

The LDO regulator 160 may include a comparator 161, a transistor TR0, and a plurality of resistors R7 and R8.

The voltage V11 may be applied to a negative terminal of the comparator 161. A voltage Vref6 may be applied to a positive terminal of the comparator 161. The comparator 161 may compare the voltage V11 and the voltage Vref6. When a voltage level of the voltage Vref6 is higher than the voltage level of the voltage V11, the comparator 161 may output a signal having the first logical value. When the voltage level of the voltage Vref6 is equal to or lower than the voltage level of the voltage V11, the comparator 161 may output the signal having the second logical value.

A signal output from the comparator 161 may be applied to a gate of the transistor TR0. The transistor TR0 may determine whether to output a current to a node ND7, based on a logical value of the signal output from the comparator 161. When a signal having the first logical value is received from the comparator 161, the transistor TR0 may not output a current to the node ND7. When a signal having the second logical value is received from the comparator 161, the transistor TR0 may output a current to the node ND7. That is, the voltage level of the voltage Vref6 may be equal to the voltage level of the voltage V11 through the above operations of the comparator 161 and the transistor TR0. A voltage level of the voltage V12 may be calculated based on that the voltage level of the voltage Vref6 is equal to the voltage level of the voltage V11. The voltage level of the voltage V12 is expressed by Equation 5 below.

$$V12 = (V11 - V_{SS}) \times \left(1 + \frac{R7}{R8}\right) + V_{SS} \qquad [\text{Equation 5}]$$

In Equation 5 above, "V12", "V11", and "VSS" denote a voltage level of the voltage V12, the voltage level of the voltage V11, and the voltage level of the voltage VSS, respectively. Also, "R7" and "R8" denote a resistance magnitude of the resistor R7 and a resistance magnitude of the resistor R8, respectively. The voltage level of the voltage V12 may be determined based on resistance magnitudes of the resistors R7 and R8. That is, the LDO regulator 160 may adjust the voltage V11 to generate the voltage V12.

Figure 8:
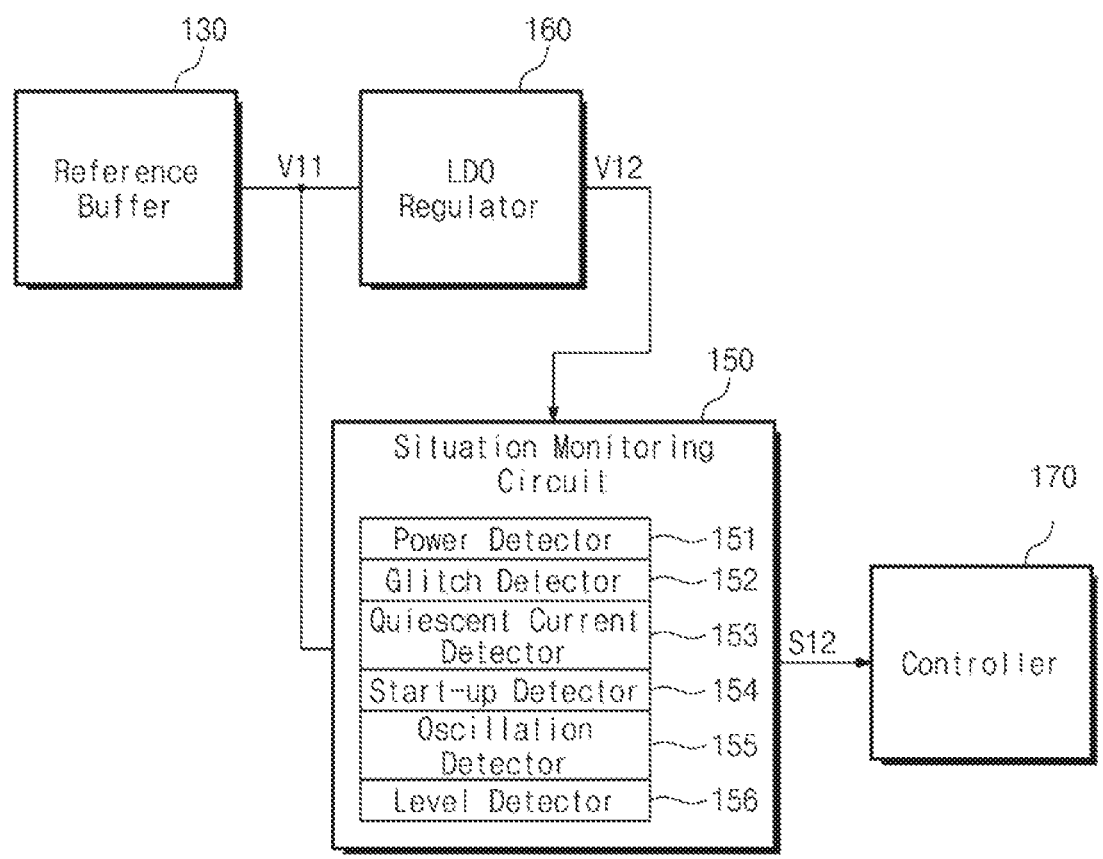
FIG. 8 is a block diagram for describing functions of a situation monitoring circuit of the electronic device of FIG. 1, according to an embodiment.

FIG. 8 is a block diagram for describing functions of a situation monitoring circuit of the electronic device of FIG. 1, according to an exemplary embodiment.

The situation monitoring circuit 150 may include a power detector 151, a glitch detector 152, a quiescent current detector 153, a start-up detector 154, an oscillation detector 155, and a level detector 156. Like the remaining components of the power manager circuit 10 of FIG. 1, the situation monitoring circuit 150 may operate based on the supply voltage VDD and the ground voltage VSS. The situation monitoring circuit 150 may receive the voltage V11 and the voltage V12. The situation monitoring circuit 150 may determine whether an error occurs in the LDO regulator 150, based on the voltage V11 and the voltage V12. Also, the situation monitoring circuit 150 may monitor overall situations of the power manager circuit 10 of FIG. 1, based on the voltage V11 and the voltage V12.

The power detector 151 may detect that the voltage level of the voltage V12 is equal to or higher than a specific voltage level. When the voltage level of the voltage V12 is equal to or higher than the specific voltage level, the power detector 151 may determine that the electronic device 100 of FIG. 1 is turned on. However, exemplary embodiments are not limited thereto. For example, in some exemplary embodiments, the power detector 151 may detect that the voltage level of the voltage V11 is equal to or higher than the specific voltage level. When the voltage level of the voltage V11 is equal to or higher than the specific voltage level, the power detector 151 may determine that the electronic device 100 of FIG. 1 is turned on.

The glitch detector 152 may detect a glitch of the voltage V12. A glitch denotes a spike or an overshoot of the voltage V12. The glitch detector 152 may determine whether an error occurs in the LDO regulator 160, based on a number of times that a glitch occurs or based on a magnitude of a glitch.

The quiescent current detector 153 may calculate an amount of power consumption of the LDO regulator 160, based on the voltages V11 and V12. When the amount of power consumption of the LDO regulator 160 is out of a normal range, the quiescent current detector 153 may determine that an error occurs in the LDO regulator 160. The normal range may be determined experimentally or may be preset.

The start-up detector 154 may measure a time length from when the electronic device 100 is turned on to when the voltage V12 has (or reaches) a target voltage level, based on the voltages V11 and V12. The start-up detector 154 may determine whether the power manager circuit 10 operates normally, based on the measured time length. When the measured time length is longer than a reference time length, the start-up detector 154 may determine that the power manager circuit 10 operates abnormally. The reference time length may be set experimentally or may be preset.

The oscillation detector 155 may determine whether the voltage level of the voltage V12 oscillates, based on the voltages V11 and V12. That the voltage level of the voltage V12 oscillates denotes that the voltage level of the voltage V12 is not uniform and continuously varies. When the voltage level of the voltage V12 oscillates, the oscillation detector 155 may determine that an error occurs in the LDO regulator 160.

The level detector 156 may detect that the voltage level of the voltage V12 is within the normal range. The normal range may be set experimentally or may be preset. When the voltage level of the voltage V12 is out of the normal range, the level detector 156 may determine that an error occurs in the LDO regulator 160. However, even though an error does not occur in the LDO regulator 160, when the voltage V11 is abnormal, the voltage level of the voltage V12 may be out of the normal range. In this case, through the second monitoring circuit 140 of FIG. 4, the power manager circuit 10 may notify the controller 170 that the voltage V11 is abnormal. Also, to reduce the probability that the situation in which the voltage V11 is abnormal and the voltage V12 is out of the normal range occurs, an electronic device 200 to be described with reference to FIG. 10 may be provided.

The situation monitoring circuit 150 may generate the alarm signal S12 based on information obtained from the power detector 151, the glitch detector 152, the quiescent current detector 153, the start-up detector 154, the oscillation detector 155, and/or the level detector 156. For example, the alarm signal S12 may indicate whether the electronic device 100 is turned on, whether a glitch is detected, whether the amount of power consumption is out of the normal range, whether a time length from when the electronic device 100 is turned to when the voltage V12 has the target voltage level is longer than the reference time length, whether the voltage level of the voltage V12 oscillates, and whether the voltage level of the voltage V12 is within the normal range. For example, the controller 170 may determine whether an error occurs in the LDO regulator 160, based on information that the alarm signal S12 indicates. For another example, the alarm signal S12 may indicate whether an error occurs in the LDO regulator 160. In this case, the controller 170 may determine a hazard level of an error that the alarm signal S12 indicates.

Figure 9:
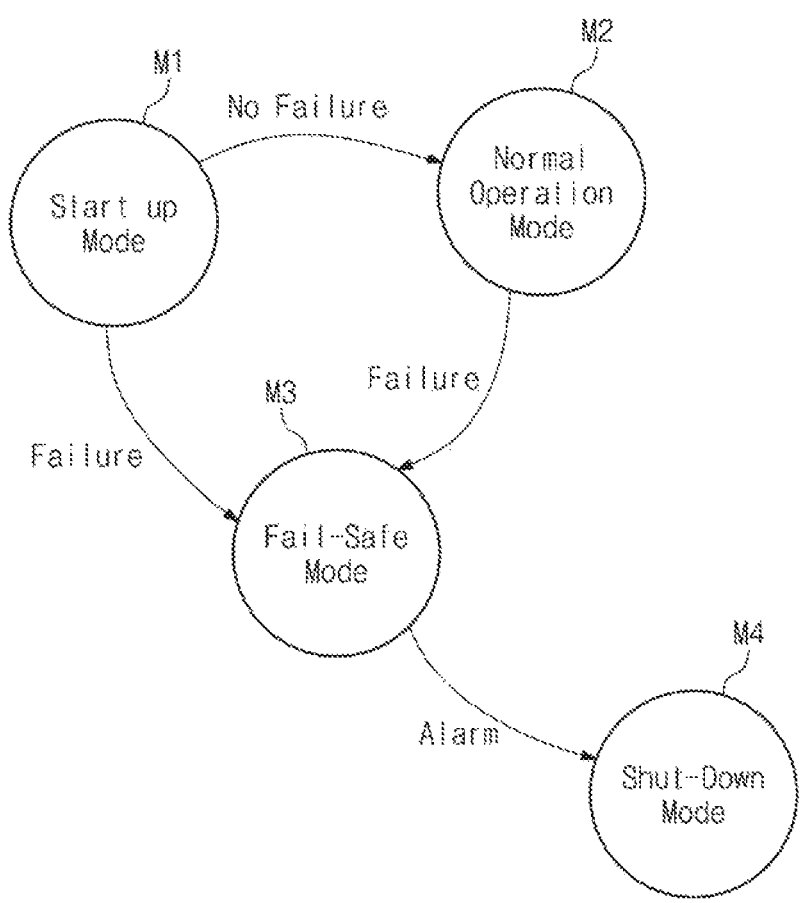
FIG. 9 is a state machine for describing an operation mode of a power manager circuit of the electronic device of FIG. 1, according to an embodiment.

FIG. 9 is a state machine for describing an operation mode of a power manager circuit of the electronic device of FIG. 1, according to an exemplary embodiment.

When the electronic device 100 of FIG. 1 is turned on, the power manager circuit 10 of FIG. 1 may operate based on the external voltage from the outside. The operation mode of the power manager circuit 10 may be switched to a start-up mode M1 as soon as the external voltage is applied to the power manager circuit 10. In the start-up mode M1, the power manager circuit 10 may perform preparation operations for generating the voltage V12.

The operation mode of the power manager circuit 10 may be switched to a normal operation mode M2 when an error does not occur (No Failure) after the operation mode of the power manager circuit 10 is switched to the start-up mode M1. In the normal operation mode M2, the power manager circuit 10 may generate the voltages V10 and V11 and may check whether an error occurs in the bandgap reference circuit 110, the reference buffer 130, the LDO regulator 160, etc.

The power manager circuit 10 may switch the operation mode to a fail-safe mode M3 when an error occurs (Failure) after the operation mode of the power manager circuit 10 is switched to the start-up mode M1 or when an error occurs (Failure) after the operation mode of the power manager circuit 10 is switched to the normal operation mode M2. In the fail-safe mode M3, the power manager circuit 10 may transmit the alarm signals S10, S11, and S12 to the controller 170 of FIG. 1. In this case, the alarm signals S10, S11, and S12 may indicate that an error occurs in the power manager circuit 10.

The controller 170 may output the control signal A10 based on the alarm signals S10, S11, and S12. The operation mode of the power manager circuit 10 may be switched to a shut-down mode M4 by the control signal A10. In the shut-down mode M4, the power manager circuit 10 may temporarily stop generating the voltage V12. The situation where the operating mode of the power manager circuit 10 is changed by the control signal A10 that is based on the alarm signals S10, S11, and S12 is conceptually illustrated by "Alarm" in FIG. 9. The state diagram of FIG. 9 is exemplary, and exemplary embodiments are not limited to the state diagram illustrated in FIG. 9. For example, the technique of the present disclosure may be identically applied to a state machine where various states capable of being defined by various protocols are included.

Figure 10:
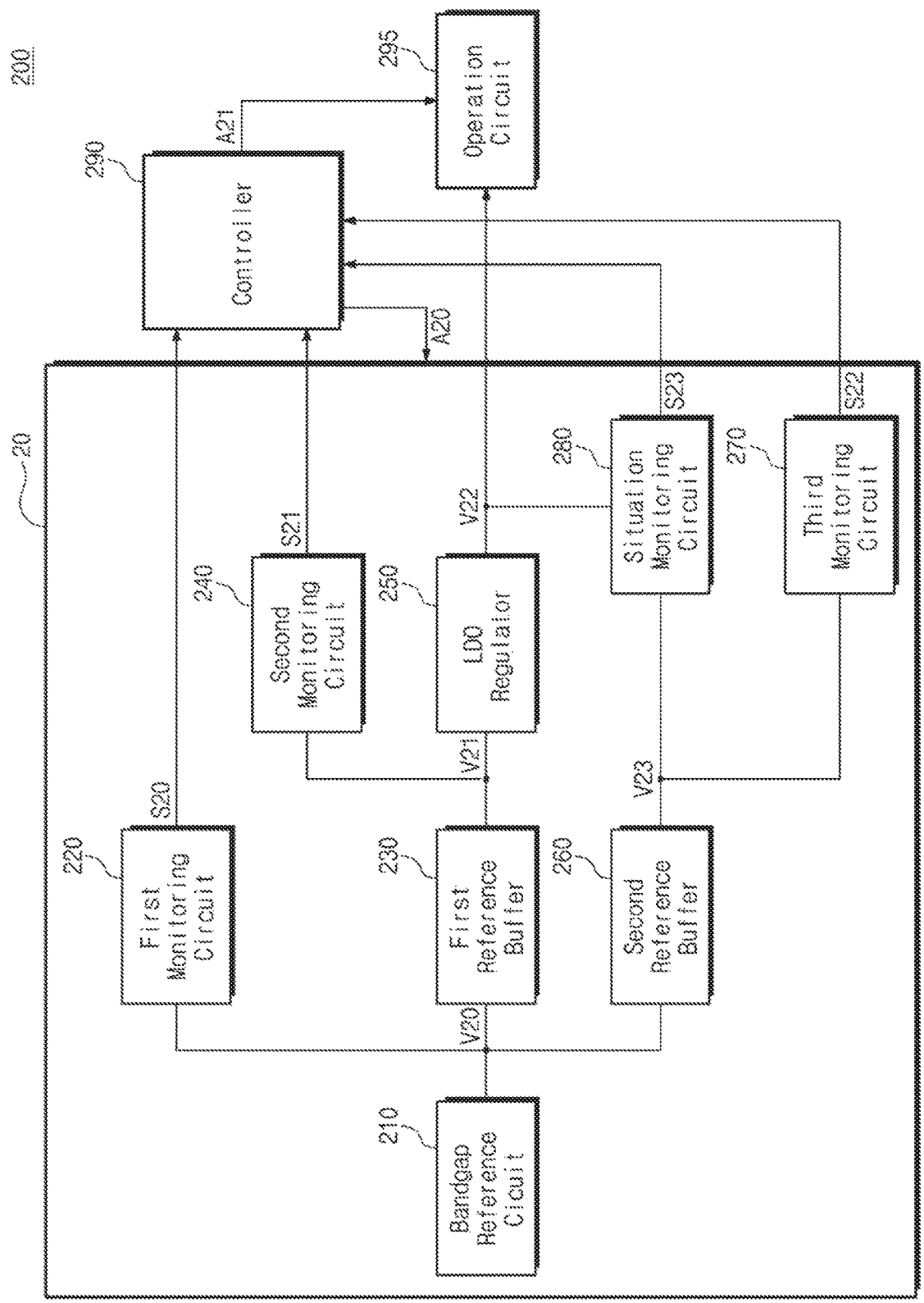
FIG. 10 is a block diagram illustrating an electronic device for detecting an internal error of a power manager circuit, according to another embodiment.

FIG. 10 is a block diagram illustrating an electronic device for detecting an internal error of a power manager circuit, according to another embodiment.

An electronic device 200 may include a bandgap reference circuit 210, a first monitoring circuit 220, a first reference buffer 230, a second monitoring circuit 240, an LDO regulator 250, a second reference buffer 260, a third monitoring circuit 270, a situation monitoring circuit 280, a controller 290, and an operation circuit 295. In the following description, a power manager circuit 20 denotes a circuit including the bandgap reference circuit 210, the first monitoring circuit 220, the first reference buffer 230, the second monitoring circuit 240, the LDO regulator 250, the second reference buffer 260, the third monitoring circuit 270, and the situation monitoring circuit 280. However, exemplary embodiments are not limited thereto. For example, in some exemplary embodiments, the power manager circuit 20 may omit some of the components illustrated in FIG. 10 or may further include one or more components not illustrated in FIG. 10.

The bandgap reference circuit 210 may generate a voltage V20 by using an external voltage applied from the outside the power manager circuit 20. The first monitoring circuit 220 may determine whether the voltage V20 is within a normal range. The normal range may be set experimentally or may be preset. The first monitoring circuit 220 may determine whether an error occurs in the bandgap reference circuit 210, based on whether the voltage V20 is within the normal range. The first monitoring circuit 220 may output an alarm signal S20 to the controller 290, based on the determination of whether the error occurs.

The first reference buffer 230 may generate a voltage V21, based on the voltage V20. The second monitoring circuit 240 may determine whether the voltage V21 is within a normal range. The normal range may be set experimentally or may be preset. The second monitoring circuit 240 may determine whether an error occurs in the first reference buffer 230, based on the determination of whether the voltage is within the normal range. The second monitoring circuit 240 may output an alarm signal S21 to the controller 290, based on the determination of whether the error occurs.

The LDO regulator 250 may generate a voltage V22, based on the voltage V21. The voltage V22 may be used as an operation voltage of the operation circuit 295.

The bandgap reference circuit 210, the first monitoring circuit 220, the first reference buffer 230, the second monitoring circuit 240, the LDO regulator 250, and the operation circuit 295 may operate substantially the same as the bandgap reference circuit 110, the first monitoring circuit 120, the reference buffer 130, the second monitoring circuit 140, the LDO regulator 160, and the operation circuit 180 of FIG. 1. Thus, additional description will be omitted for conciseness and to avoid redundancy.

The second reference buffer 260, the third monitoring circuit 270, the situation monitoring circuit 280, and the controller 290 provide operations similar to those of the reference buffer 130, the second monitoring circuit 140, the situation monitoring circuit 150, and the controller 170 of FIG. 1. Below, the second reference buffer 260, the third monitoring circuit 270, the situation monitoring circuit 280, and the controller 290 will be more fully described.

The second reference buffer 260 may be supplied with the voltage V20. The second reference buffer 260 may generate a voltage V23 by using the voltage V20. The voltage V23 may be a voltage that is used in the third monitoring circuit 270 and the situation monitoring circuit 280.

The third monitoring circuit 270 may receive the voltage V23. The third monitoring circuit 270 may determine whether an error occurs in the second reference buffer 260, based on a voltage level of the voltage V23. The third monitoring circuit 270 may determine whether the voltage V23 is within a normal range. The normal range may be set experimentally or may be preset. The normal range denotes a voltage level range that the voltage V23 is capable of having when an error does not occur in the second reference buffer 260.

When it is determined that the voltage V23 is within the normal range, the third monitoring circuit 270 may output an alarm signal S22 indicating the first logical value to the controller 290. When it is determined that the voltage V23 is not within the normal range, the third monitoring circuit 270 may output the alarm signal S22 indicating the second logical value to the controller 290.

The situation monitoring circuit 280 may receive the voltage V22 and the voltage V23. The situation monitoring circuit 280 may determine whether an error occurs in the LDO regulator 250, based on the voltage V22 and the voltage V23. However, exemplary embodiments are not limited thereto. For example, in some exemplary embodiments, the situation monitoring circuit 280 may be a monitoring circuit that finally determines whether the voltage V22 is abnormal before the voltage V22 is output from the power manager circuit 20. That is, the situation monitoring circuit 280 may finally monitor a situation of the power manager circuit 20. Below, the description will focus on an example in which the situation monitoring circuit 280 determines whether an error occurs in the LDO regulator 250, based on the voltage V22 and the voltage V23.

When it is determined that an error does not occur in the LDO regulator 250, the situation monitoring circuit 280 may output an alarm signal S23 having the first logical value to the controller 290. When it is determined that an error occurs in the LDO regulator 250, the situation monitoring circuit 280 may output the alarm signal S23 having the second logical value to the controller 290.

The controller 290 may receive the alarm signals S21, S22, and S23. The controller 290 may determine a hazard level indicated by one or more errors occurring in the power manager circuit 20, based on the alarm signals S21, S22, and S23. The controller 290 may generate control signals A20 and A21, based on the hazard level indicated by one or more errors occurring in the power manager circuit 20 and an ASIL of the operation circuit 295.

That is, according to the exemplary embodiment illustrated in FIG. 10, the situation monitoring circuit 280 may be prevented from operating abnormally due to an error occurring in the first reference buffer 230 by additionally including the second reference buffer 260. Also, according to the exemplary embodiment illustrated in FIG. 10, one or more errors occurring in the second reference buffer 260 may be detected by additionally including the third monitoring circuit 270 corresponding to the second reference buffer 260.

Figure 11:
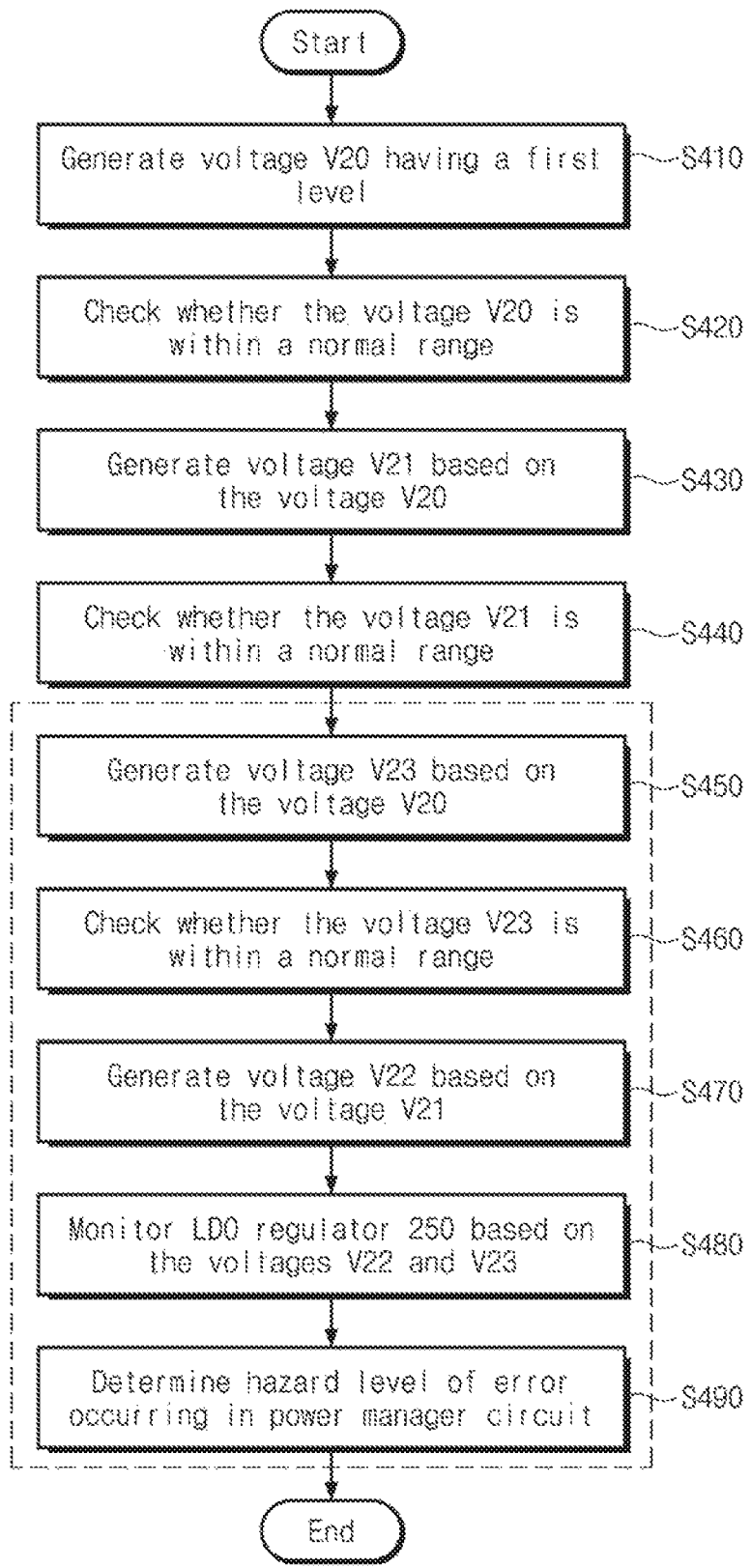
FIG. 11 is a flowchart for describing an error detecting operation of the electronic device of FIG. 10, according to an embodiment.

FIG. 11 is a flowchart for describing an error detecting operation of the electronic device of FIG. 10, according to an exemplary embodiment.

In operation S410, the bandgap reference circuit 210 may generate the voltage V20 having a first level. For example, the bandgap reference circuit 210 may generate the voltage V20 having the first level based on the external voltage applied from the outside.

In operation S420, the first monitoring circuit 220 may check whether the voltage V20 is within the normal range. The first monitoring circuit 220 may detect an error of the bandgap reference circuit 210, based on whether the voltage V20 is within the normal range. The first monitoring circuit 220 may determine a logical value of the alarm signal S20, based on whether an error occurs in the bandgap reference circuit 210.

In operation S430, the first reference buffer 230 may generate the voltage V21, based on the voltage V20. In detail, the first reference buffer 230 may adjust the voltage V20 having the first level to the voltage V21 having a second level.

In operation S440, the second monitoring circuit 240 may check whether the voltage V21 is within a normal range. The second monitoring circuit 240 may detect an error of the first reference buffer 230, based on whether the voltage V21 is within the normal range. The second monitoring circuit 240 may determine a logical value of the alarm signal S21, based on whether an error occurs in the first reference buffer 230. The normal range in operation S420 and the normal range in operation S440 may be different ranges.

Operation S450 to operation S490 may be operations associated with the second reference buffer 260 and the third monitoring circuit 270.

In operation S450, the second reference buffer 260 may generate the voltage V23, based on the voltage V20. In detail, the second reference buffer 260 may adjust the voltage V20 having the first level to the voltage V23 having the second level.

In operation S460, the third monitoring circuit 270 may check whether the voltage V23 is within a normal range. The third monitoring circuit 270 may detect an error of the second reference buffer 260, based on whether the voltage V23 is within the normal range. The third monitoring circuit 270 may determine a logical value of the alarm signal S22, based on whether an error occurs in the second reference buffer 260. The normal range in operation S420, the normal range in operation S440 and the normal range in operation S460 may be different ranges.

In operation S470, the LDO regulator 250 may generate the voltage V22, based on the voltage V21. In detail, the LDO regulator 250 may adjust the voltage V21 having the second level to the voltage V22 having a third level.

In operation S480, the situation monitoring circuit 280 may monitor the LDO regulator 250, based on the voltage V22 and the voltage V23. That is, the situation monitoring circuit 280 may check whether an error occurs in the LDO regulator 250, based on the voltage V22 and the voltage V23. The situation monitoring circuit 280 may determine a logical value of the alarm signal S23, based on whether an error occurs in the LDO regulator 250.

In operation S490, the controller 290 may determine a hazard level of the error occurring in the power manager circuit 20. For example, the controller 290 may determine the hazard level of the error occurring in the power manager circuit 20, based on the alarm signals S21, S22, and S23. The controller 290 may control the operation circuit 295 and the power manager circuit 20, based on the hazard level of the error and the ASIL of the operation circuit 295.

Figure 12:
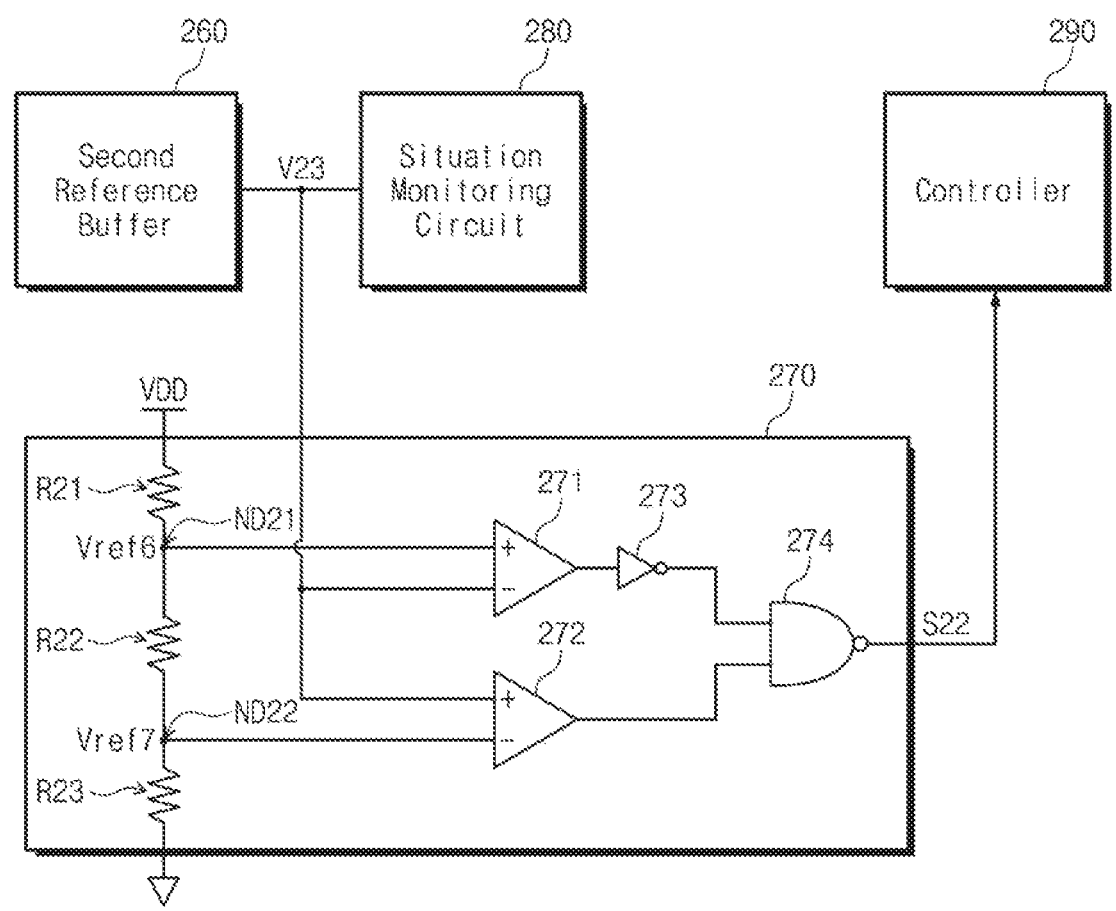
FIG. 12 is a circuit diagram illustrating a configuration of a third monitoring circuit of the electronic device of FIG. 10, according to an embodiment.

FIG. 12 is a circuit diagram illustrating a configuration of a third monitoring circuit of the electronic device of FIG. 10, according to an exemplary embodiment.

The third monitoring circuit 270 may have substantially the same configuration with the second monitoring circuit 240 described with reference to FIG. 5.

That is, the third monitoring circuit 270 may include a plurality of resistors R21, R22, and R23, a plurality of comparators 271 and 272, an inverter 273, and a logic gate 275. The plurality of resistors R21, R22, and R23, the plurality of comparators 271 and 272, the inverter 273, and the logic gate 275 may correspond respectively to plurality of resistors R4, R5, and R6, the plurality of comparators 141 and 142, the inverter 143, and the logic gate 144 illustrated in FIG. 5, and thus a repeated description thereof is omitted for conciseness. As with the example illustrated in FIG. 5, the third monitoring circuit 270 illustrated in FIG. 12 is only an example of an embodiment for implementing the third monitoring circuit 270 described with reference to FIG. 10. Accordingly, in some exemplary embodiments, the third monitoring circuit 270 may omit some of the components illustrated in FIG. 12 or may further include one or more components not illustrated in FIG. 12. Exemplary embodiments are not limited to the configuration illustrated in FIG. 12.

Figure 13:
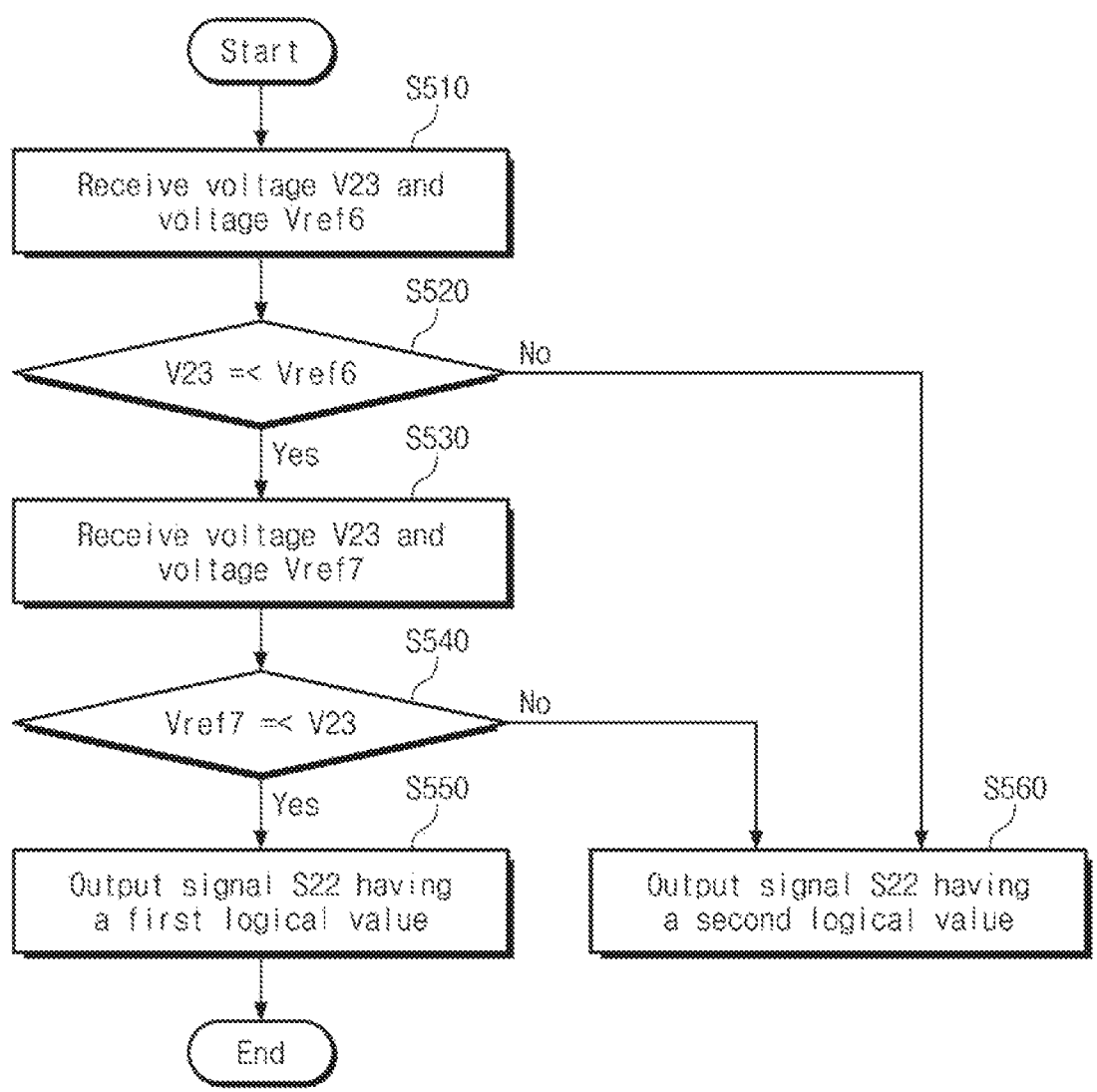
FIG. 13 is a flowchart for describing operations of the third monitoring circuit of FIG. 12, according to an embodiment.

FIG. 13 is a flowchart for describing operations of the third monitoring circuit of FIG. 12, according to an exemplary embodiment. The flowchart will be described with reference to FIGS. 12 and 13.

In operation S510, the comparator 271 may receive the voltage V23 and a voltage Vref6.

In operation S520, the comparator 271 may compare the voltage V23 and the voltage Vref6.

When the voltage level of the voltage V23 is higher than the voltage level of the voltage Vref6 (S520, No), operation S560 is performed. In operation S560, the logic gate 274 may output the alarm signal S22 having the second logical value regardless of the signal output from the comparator 272.

When the voltage level of the voltage V23 is less than or equal to the voltage level of the voltage Vref6 (S520, Yes), operation S530 is performed. In operation S530, the comparator 272 may receive the voltage V23 and a voltage Vref7.

In operation S540, the comparator 272 may compare the voltage V23 and the voltage Vref7.

When the voltage level of the voltage Vref7 is higher than the voltage level of the voltage V23 (S540, No), operation S560 is performed. In operation S560, the logic gate 274 may output the alarm signal S22 having the second logical value.

When the voltage level of the voltage Vref7 is less than or equal to the voltage level of the voltage V23 (S540, Yes), operation S550 is performed. In operation S550, the logic gate 274 may output the alarm signal S22 having the first logical value.

However, the order of operation S510 to operation S560 that the third monitoring circuit 270 performs is not limited to the order described with reference to FIG. 13. For example, in some exemplary embodiments, operation S530 and operation S540 may be performed before operation S510 and operation S520. For another example, in some exemplary embodiments, operation S530 and operation S540 may be performed at the same time with operation S510 and operation S520.

Figure 14:
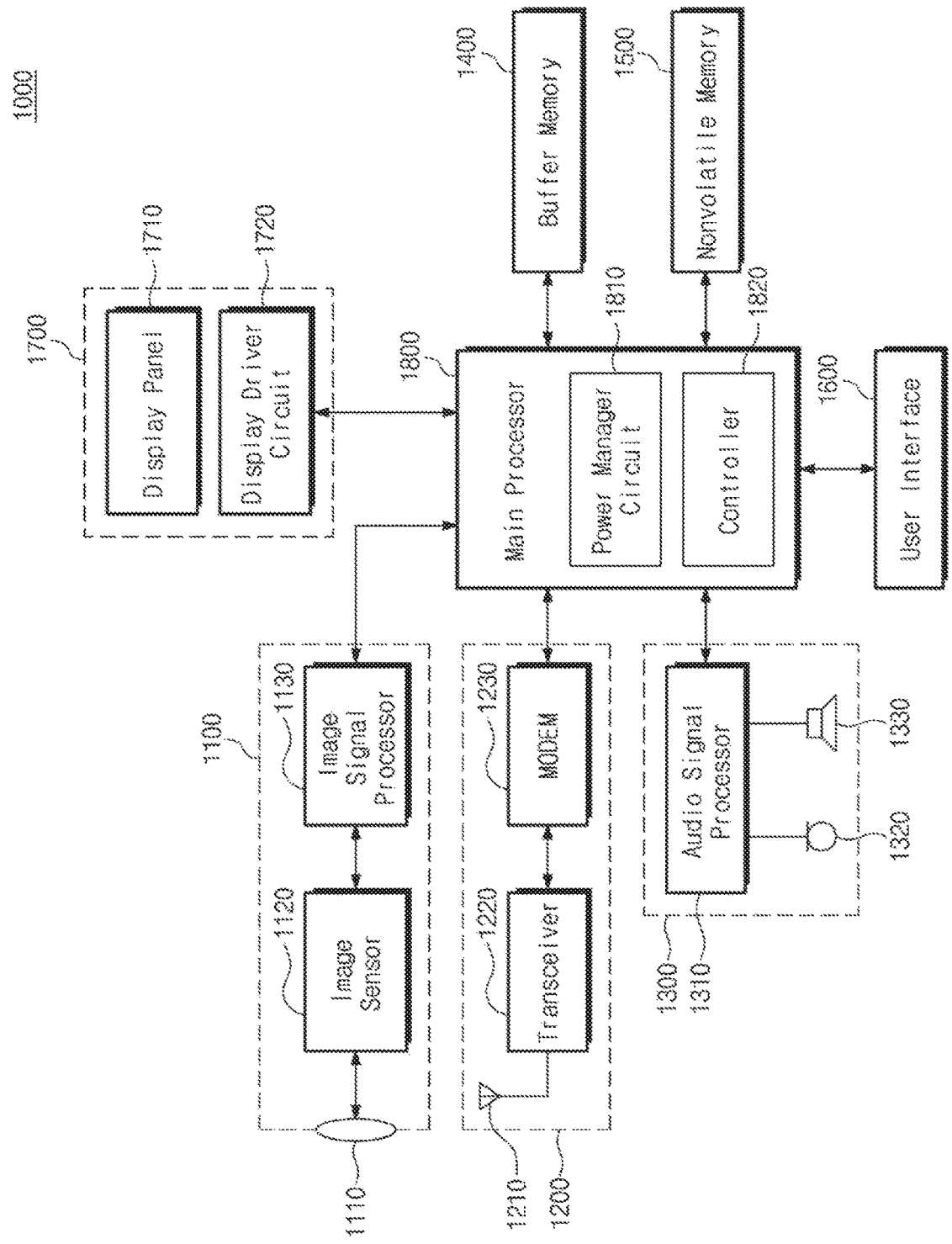
FIG. 14 is a block diagram illustrating an embodiment of an electronic device of FIG. 1.

FIG. 14 is a block diagram illustrating an electronic device of FIG. 1, according to an exemplary embodiment.

An electronic device 1000 may correspond to an embodiment of the electronic device of FIG. 1.

The electronic device 1000 may include various electronic circuits. For example, the electronic circuits of the electronic device 1000 may include an image processing block 1100, a communication block 1200, an audio processing block 1300, a buffer memory 1400, a nonvolatile memory 1500, a user interface 1600, a display device 1700, and a main processor 1800.

The image processing block 1100 may receive a light through a lens 1110. An image sensor 1120 and an image signal processor 1130 included in the image processing block 1100 may generate image data associated with an external subject, based on the received light.

The communication block 1200 may exchange signals with an external device/system through an antenna 1210. A transceiver 1220 and a MODEM (Modulator/Demodulator) 1230 of the communication block 1200 may process signals, which are exchanged with the external device/system, in compliance with various wireless communication protocols.

The audio processing block 1300 may process sound information by using an audio signal processor 1310, thus playing and outputting the audio. The audio processing block 1300 may receive an audio input through a microphone 1320. The audio processing block 1300 may output the audio through a speaker 1330.

The buffer memory 1400 may store data that are used for an operation of the electronic device 1000. For example, the buffer memory 1400 may temporarily store data processed or to be processed by the main processor 1800. For example, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500 may be a physical storage device. In this case, the nonvolatile memory 1500 may include one or more nonvolatile memories, a memory controller, and a buffer. The nonvolatile memory 1500 may store data regardless of whether a power is supplied. For example, the nonvolatile memory 1500 may include at least one of a flash memory, a PRAM, an MRAM, a ReRAM, a FRAM, etc. For example, the nonvolatile memory 1500 may include a removable memory such as a secure digital (SD) card, and/or an embedded memory such as an embedded multimedia card (eMMC).

Also, the nonvolatile memory 1500 may be a virtual storage device that is operated by a virtual storage driver in an operating system. In this case, the nonvolatile memory 1500 may store data without limitation on a physical method or a substantial storage device.

The user interface 1600 may enable communication between a user and the electronic device 1000. For example, the user interface 1600 may include input interfaces such as a keypad, a button, a touch screen, a touch pad, a gyroscope sensor, a vibration sensor, and an acceleration sensor. For example, the user interface 1600 may include output interfaces such as a motor and a LED lamp.

The display device 1700 may receive data from an external device (e.g., the main processor 1800). A display driver circuit 1720 may display an image in a display panel 1710 based on data input to the display device 1700.

The main processor 1800 may control overall operations of the components of the electronic device 1000. The main processor 1800 may process various operations for the purpose of operating the electronic device 1000. For example, the main processor 1800 may be implemented with an operation processing device/circuit, which includes one or more processor cores, such as a general-purpose processor, a special-purpose processor, an application processor, or a microprocessor, or the like.

The main processor 1800 may include a power manager circuit 1810 and a controller 1820. The power manager circuit 1810 may include the power manager circuit 10 of FIG. 1 or the power manager circuit 20 of FIG. 10. Also, the controller 1820 may include the controller 170 of FIG. 1 or the controller 290 of FIG. 10. The main processor 1800 may supply a power to the electronic circuits 1100 to 1700, by using the power manager circuit 1810. The electronic circuits 1100 to 1700 may correspond to the operation circuit 180 of FIG. 1 or the operation circuit 295 of FIG. 10. The power manager circuit 1810 may detect an internal error occurring in the power manager circuit 1810. When an internal error occurs, the power manager circuit 1810 may output an alarm signal to the controller 1820. The controller 1820 may control the power manager circuit 1810 and the electronic circuits 1100 to 1700, based on the alarm signal received from the power manager circuit 1810.

However, the exemplary components illustrated in FIG. 14 are provided for better understanding, and exemplary embodiments are not limited thereto. In some exemplary embodiments, the electronic device 1000 may omit one or more of the components illustrated in FIG. 14; additionally or alternatively, the electronic device 1000 may further include at least one component not illustrated in FIG. 14.

Figure 15:
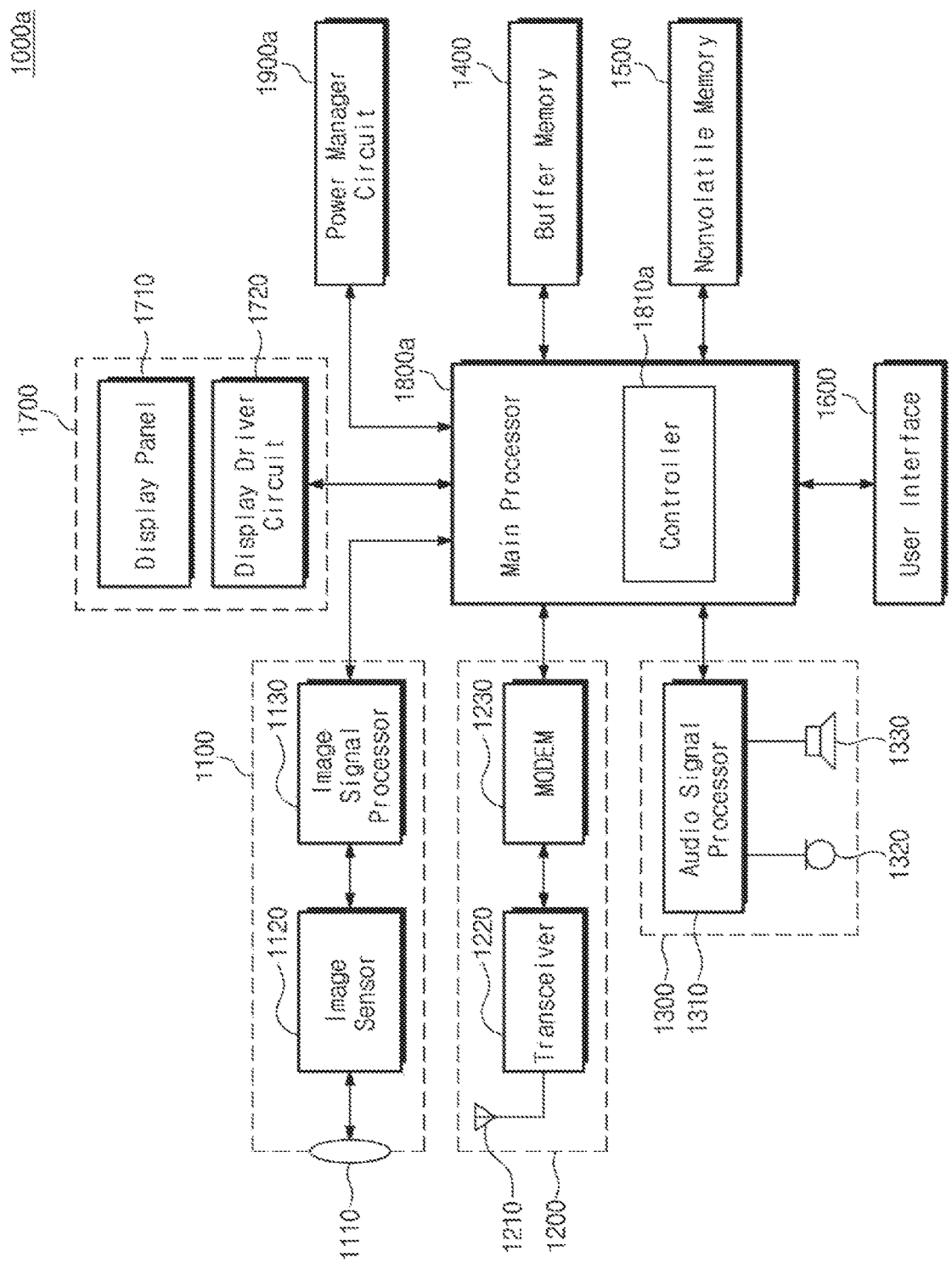
FIG. 15 is a block diagram illustrating another embodiment of an electronic device of FIG. 1.

FIG. 15 is a block diagram illustrating another embodiment of an electronic device of FIG. 1.

An electronic device 1000a may include the image processing block 1100, the communication block 1200, the audio processing block 1300, the buffer memory 1400, the nonvolatile memory 1500, the user interface 1600, the display device 1700, a main processor 1800a, and a power manager circuit 1900a. The image processing block 1100, the communication block 1200, the audio processing block 1300, the buffer memory 1400, the nonvolatile memory 1500, the user interface 1600, and the display device 1700 of the electronic device 1000a provide substantially the same operations as the image processing block 1100, the communication block 1200, the audio processing block 1300, the buffer memory 1400, the nonvolatile memory 1500, the user interface 1600, and the display device 1700 of FIG. 14. Thus, additional description will be omitted for conciseness and to avoid redundancy.

The power manager circuit 1900a may include the power manager circuit 10 of FIG. 1 or the power manager circuit 20 of FIG. 10. Also, a controller 1810a may include the controller 170 of FIG. 1 or the controller 290 of FIG. 10.

However, unlike the main processor 1800 illustrated in FIG. 14, the main processor 1800a illustrated in FIG. 15 may not include the power manager circuit 1900a. In some exemplary embodiments, the power manager circuit 1900a may be placed on a chip different from that of the main processor 1800. In this case, the power manager circuit 1900a may automatically supply a power to the electronic circuits 1100 to 1700 and 1800a.

According to various embodiments, an electronic device may detect an internal error occurring in a power manager circuit for each step in the power generation, i.e., for a plurality of voltages generated by the power manager circuit. The electronic device may control an operation of an internal circuit depending on a hazard level of the detected error and an ASIL of the electronic device.

While various exemplary embodiments have been described, it will be apparent to those of ordinary skill in the art that various changes and modifications may be made thereto without departing from the spirit and scope set forth in the following claims.

What is claimed is:

1. A power manager circuit comprising:
   a bandgap reference circuit configured to generate a first voltage, based on an external voltage that is external to the power manager circuit;
   a first monitoring circuit configured to determine a logical value of a first alarm signal, based on whether a first voltage level of the first voltage is within a first range;
   a reference buffer configured to generate a second voltage, based on the first voltage; and
   a second monitoring circuit configured to determine a logical value of a second alarm signal, based on whether a second voltage level of the second voltage is within a second range.

2. The power manager circuit of claim 1, wherein the first range is from a first reference level to a second reference level, and
   wherein the first monitoring circuit determines the logical value of the first alarm signal, based on a first comparison result of comparing the first reference level and the first voltage level and a second comparison result of comparing the second reference level and the first voltage level.

3. The power manager circuit of claim 2, wherein the first monitoring circuit generates a first reference voltage having the first reference level and a second reference voltage having the second reference level, by using the external voltage.

4. The power manager circuit of claim 2, wherein the first monitoring circuit includes:
   a first resistor between a power node to which the external voltage is applied and a first node;
   a second resistor between the first node and a second node;
   a third resistor between the second node and a ground node;
   a first comparator comprising a positive terminal connected to the first node and to which a first reference voltage having the first reference level is applied from the first node, and a negative terminal to which the first voltage is applied;

a second comparator comprising a positive terminal to which the first voltage is applied, and a negative terminal connected to the second node and to which a second reference voltage having the second reference level is applied from the second node;

an inverter configured to invert a signal output from the first comparator; and a NAND gate configured to receive a signal output from the inverter and a signal output from the second comparator, and to output the first alarm signal.

5. The power manager circuit of claim 2, wherein the first monitoring circuit includes:

a first resistor between a power node to which the external voltage is applied and a first node;

a second resistor between the first node and a second node;

a third resistor between the second node and a ground node;

a first comparator comprising a positive terminal to which the first voltage is applied, and a negative terminal connected to the first node and to which a first reference voltage having the first reference level is applied from the first node;

a second comparator comprising a positive terminal connected to the second node and to which a second reference voltage having the second reference level is applied from the second node, and a negative terminal to which the first voltage is applied;

an inverter configured to invert a signal output from the second comparator; and a NAND gate configured to receive a signal output from the inverter and a signal output from the first comparator, and to output the first alarm signal.

6. The power manager circuit of claim 2, wherein the first monitoring circuit includes:

a first resistor between a power node to which the external voltage is applied and a first node;

a second resistor between the first node and a second node;

a third resistor between the second node and a ground node;

a first comparator comprising a positive terminal connected to the first node and to which a first reference voltage having the first reference level is applied from the first node, and a negative terminal to which the first voltage is applied;

a second comparator comprising a positive terminal connected to the second node and to which a second reference voltage having the second reference level is applied from the second node, and a negative terminal to which the first voltage is applied; and an AND gate configured to receive a signal output from the first comparator and a signal output from the second comparator, and to output the first alarm signal.

7. The power manager circuit of claim 1, further comprising:

a low drop-out (LDO) regulator configured to generate a third voltage, based on the second voltage; and a situation monitoring circuit configured to determine whether an error occurs in the power manager circuit, based on the second voltage and the third voltage.

8. The power manager circuit of claim 7, wherein the situation monitoring circuit includes:

a power detector configured to detect whether an electronic device that includes the power manager circuit is turned on, based on the third voltage;

a glitch detector configured to detect a glitch of the third voltage;

a quiescent current detector configured to measure an amount of power consumption of the LDO regulator;

a start-up detector configured to measure a time length from a time at which the electronic device is turned on to a time at which the third voltage reaches a target voltage level, based on the second voltage and the third voltage;

an oscillation detector configured to detect an oscillation of the third voltage; and a level detector configured to determine whether the third voltage is within a third range, wherein the situation monitoring circuit determines whether the error occurs in the power manager circuit, based on information obtained through one or more of the power detector, the glitch detector, the quiescent current detector, the start-up detector, the oscillation detector, and the level detector.

9. An electronic device comprising:

a bandgap reference circuit configured to generate a first voltage, based on an external voltage;

a first monitoring circuit configured to determine whether a first error occurs in the bandgap reference circuit based on the first voltage and to determine a logical value of a first alarm signal depending on whether the first error occurs;

a reference buffer configured to generate a second voltage, based on the first voltage; and a second monitoring circuit configured to determine whether a second error occurs in the reference buffer based on the second voltage and to determine a logical value of a second alarm signal depending on whether the second error occurs.

10. The electronic device of claim 9, wherein, when the first voltage is not within a first range, the first monitoring circuit determines that the first error occurs in the bandgap reference circuit, and wherein, when the second voltage is not within a second range, the second monitoring circuit determines that the second error occurs in the reference buffer.

11. The electronic device of claim 9, wherein the reference buffer is a first reference buffer, and wherein the electronic device further comprises:

a second reference buffer configured to generate a third voltage, based on the first voltage; and a third monitoring circuit configured to determine whether a third error occurs in the second reference buffer based on the third voltage and to determine a logical value of a third alarm signal depending on whether the third error occurs.

12. The electronic device of claim 11, wherein, when the second error and the third error do not occur in the first reference buffer and the second reference buffer, respectively, the second voltage and the third voltage are equal.

13. The electronic device of claim 11, further comprising:

an LDO regulator configured to generate a fourth voltage, based on the second voltage; and a situation monitoring circuit configured to determine whether a fourth error occurs in the LDO regulator based on the third voltage and the fourth voltage, and to generate a fourth alarm signal depending on whether the fourth error occurs.

14. The electronic device of claim 13, further comprising:

a controller configured to determine a hazard level based on the first alarm signal, the second alarm signal, the third alarm signal, and the fourth alarm signal, wherein the controller controls the bandgap reference circuit and the reference buffer based on the hazard level.

15. An electronic device comprising:

a power manager circuit configured to generate a first voltage based on an external voltage that is external to the power manager circuit, to output a first alarm signal when a voltage level of the first voltage is not within a first range, to generate a second voltage based on the first voltage, and to output a second alarm signal when a voltage level of the second voltage is not within a second range; and a controller configured to determine a hazard level indicating one or more errors occurring in the power manager circuit based on the first alarm signal and the second alarm signal, and to control the power manager circuit based on the hazard level.

16. The electronic device of claim 15, wherein the power manager circuit is further configured to generate a third voltage based on the second voltage, and wherein the electronic device further comprises:

an operation circuit configured to operate based on the third voltage, wherein the controller controls the power manager circuit and the operation circuit based on the hazard level and based on an automotive safety integrity level (ASIL) of the operation circuit.

17. The electronic device of claim 16, wherein the power manager circuit is further configured to:

generate a fourth voltage based on the first voltage;

output a third alarm signal to the controller when a voltage level of the fourth voltage is not within a third range;

determine whether an error occurs in the power manager circuit based on the third voltage and the fourth voltage; and output a fourth alarm signal to the controller when the error occurs.

18. The electronic device of claim 17, wherein the controller determines the hazard level based on the first alarm signal, the second alarm signal, and the third alarm signal, and controls the power manager circuit and the operation circuit based on the hazard level and based on an ASIL of the operation circuit.

19. The electronic device of claim 15, wherein the power manager circuit and the controller are included in a main processor of the electronic device.

20. The electronic device of claim 15, wherein the controller is included in a main processor of the electronic device, and wherein the power manager circuit is included in a power management integrated circuit (PMIC) disposed on a chip different from a chip on which the main processor is disposed.

* * * * *